United States Patent
Sato et al.

(10) Patent No.: US 7,460,254 B2
(45) Date of Patent: Dec. 2, 2008

(54) IMAGE PRINTING SYSTEM, IMAGE PRINTING APPARATUS, AND IMAGE PRINTING METHOD

(75) Inventors: Junji Sato, Tokyo (JP); Akio Ueda, Tokyo (JP); Jun Yokobori, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 878 days.

(21) Appl. No.: 10/794,312

(22) Filed: Mar. 5, 2004

(65) Prior Publication Data
US 2004/0179222 A1    Sep. 16, 2004

(30) Foreign Application Priority Data
Mar. 10, 2003   (JP) .............................. 2003-063940

(51) Int. Cl.
*G06F 15/00* (2006.01)
*G06F 15/16* (2006.01)
*G06F 17/00* (2006.01)

(52) U.S. Cl. .................... 358/1.13; 358/1.15; 358/1.14; 358/1.16; 358/1.1; 710/15; 710/16; 710/17; 710/18; 709/208; 709/209; 709/211

(58) Field of Classification Search ....... 358/1.11–1.18, 358/527; 709/201–203, 208–211, 213, 217, 709/231; 715/527, 700, 526; 710/6, 8, 14–19; 718/100, 104, 106; 700/3; G06F 15/00
See application file for complete search history.

(56) References Cited

U.S. PATENT DOCUMENTS

| | | | | |
|---|---|---|---|---|
| 4,656,524 A | * | 4/1987 | Norris et al. ................. | 358/401 |
| 4,797,706 A | * | 1/1989 | Sugishima et al. .......... | 358/300 |
| 5,287,194 A | * | 2/1994 | Lobiondo .................... | 358/296 |
| 5,774,232 A | * | 6/1998 | Tabata et al. ................ | 358/448 |
| 5,812,747 A | * | 9/1998 | Kayano et al. .............. | 358/1.15 |
| 5,901,276 A | * | 5/1999 | Murahashi et al. .......... | 358/1.13 |
| 6,078,936 A | * | 6/2000 | Martin et al. ................ | 715/527 |
| 6,948,792 B2 | * | 9/2005 | Narusawa et al. ............. | 347/19 |
| 7,006,249 B2 | * | 2/2006 | Matsuda ...................... | 358/1.9 |
| 7,031,014 B2 | * | 4/2006 | Ohwa .......................... | 358/1.18 |
| 7,130,069 B1 | * | 10/2006 | Honma ....................... | 358/1.15 |
| 7,167,256 B1 | * | 1/2007 | Koike et al. ................. | 358/1.15 |

(Continued)

FOREIGN PATENT DOCUMENTS

JP    2002-127560 A    5/2002

*Primary Examiner*—Twyler L. Haskins
*Assistant Examiner*—Chad Dickerson
(74) *Attorney, Agent, or Firm*—Frishauf, Holtz, Goodman & Chick, P.C.

(57) ABSTRACT

According to this invention, there is provided an image printing system which causes a plurality of image printing apparatuses to share and concurrently process an image printing job for outputting a plurality of prints based on image printing conditions and image information supplied from an information processing apparatus. In the image printing system of the invention, each of the image printing apparatuses interactively connected to each other has a proof/wait selection function of selecting a proof mode of outputting a single print or a wait mode of displaying image printing conditions and waiting. A master machine to which image printing conditions and image information are supplied from an information processing apparatus executes image printing operation in the proof mode or wait mode, and transfers the image printing conditions and image information to another image printing apparatus.

11 Claims, 12 Drawing Sheets

U.S. PATENT DOCUMENTS

| | | | |
|---|---|---|---|
| 7,190,473 B1* | 3/2007 | Cook et al. | 358/1.15 |
| 7,239,412 B2* | 7/2007 | Leslie | 358/1.15 |
| 7,375,836 B1* | 5/2008 | Sato | 358/1.15 |
| 2002/0048046 A1* | 4/2002 | Unno | 358/1.16 |
| 2002/0097427 A1* | 7/2002 | Kazama et al. | 358/1.15 |
| 2003/0014446 A1* | 1/2003 | Simpson et al. | 707/527 |
| 2003/0030846 A1* | 2/2003 | Mori et al. | 358/400 |
| 2003/0056180 A1* | 3/2003 | Mori | 715/530 |

* cited by examiner

FIG. 4A

SADDLE STITCHING STOPPER POSITION
+10 +10 (-128~+127)  1Step=0.1mm

| 1 | 2 | 3 |
| 4 | 5 | 6 |
| 7 | 8 | 9 |
| +↔- | 0 | SET |

NEXT PAGE  PREVIOUS PAGE    PREVIOUS WINDOW

VERTICAL PUNCHING POSITION
+10 +10 (-50~+50)  1Step=0.1mm

| 1 | 2 | 3 |
| 4 | 5 | 6 |
| 7 | 8 | 9 |
| +↔- | 0 | SET |

NEXT PAGE  PREVIOUS PAGE    PREVIOUS WINDOW

HORIZONTAL PUNCHING POSITION
+5 +5 (-50~+50)  1Step=0.1mm

| 1 | 2 | 3 |
| 4 | 5 | 6 |
| 7 | 8 | 9 |
| +↔- | 0 | SET |

NEXT PAGE  PREVIOUS PAGE    PREVIOUS WINDOW

CENTER FOLDING STOPPER POSITION
+0 +0 (-128~+127)   1Step=0.1mm

| 1 | 2 | 3 |
| 4 | 5 | 6 |
| 7 | 8 | 9 |
| +←→- | 0 | SET |

[NEXT PAGE] [PREVIOUS PAGE]   [PREVIOUS WINDOW]

CUTTING STOPPER POSITION
-12 -12 (-128~+127)   1Step=0.1mm

| 1 | 2 | 3 |
| 4 | 5 | 6 |
| 7 | 8 | 9 |
| +←→- | 0 | SET |

[NEXT PAGE] [PREVIOUS PAGE]   [PREVIOUS WINDOW]

Z-FOLDING POSITION
+5 +5 (-50~+50)   1Step=0.1mm

| 1 | 2 | 3 |
| 4 | 5 | 6 |
| 7 | 8 | 9 |
| +←→- | 0 | SET |

[NEXT PAGE] [PREVIOUS PAGE]   [PREVIOUS WINDOW]

FIG. 6A

SIDE STITCHING STOPPER POSITION
+20 +20 (-50~+50)  1Step=0.1mm

| 1 | 2 | 3 |
| 4 | 5 | 6 |
| 7 | 8 | 9 |
| +◄►- | 0 | SET |

NEXT PAGE | PREVIOUS PAGE | PREVIOUS WINDOW

HORIZONTAL SIDE STITCHING STAPLING POSITION
-10 -10 (-128~+127)  1Step=0.1mm

| 1 | 2 | 3 |
| 4 | 5 | 6 |
| 7 | 8 | 9 |
| +◄►- | 0 | SET |

NEXT PAGE | PREVIOUS PAGE | PREVIOUS WINDOW — K17

DENSITY LEVEL (C)
+1 +1 (+1~+4)  1Step=0.1mm  1(LIGHT) ~ 4(DEEP)

| 1 | 2 | 3 |
| 4 | 5 | 6 |
| 7 | 8 | 9 |
| +◄►- | 0 | SET |

NEXT PAGE | PREVIOUS PAGE | PREVIOUS WINDOW
K16 — K17

P11

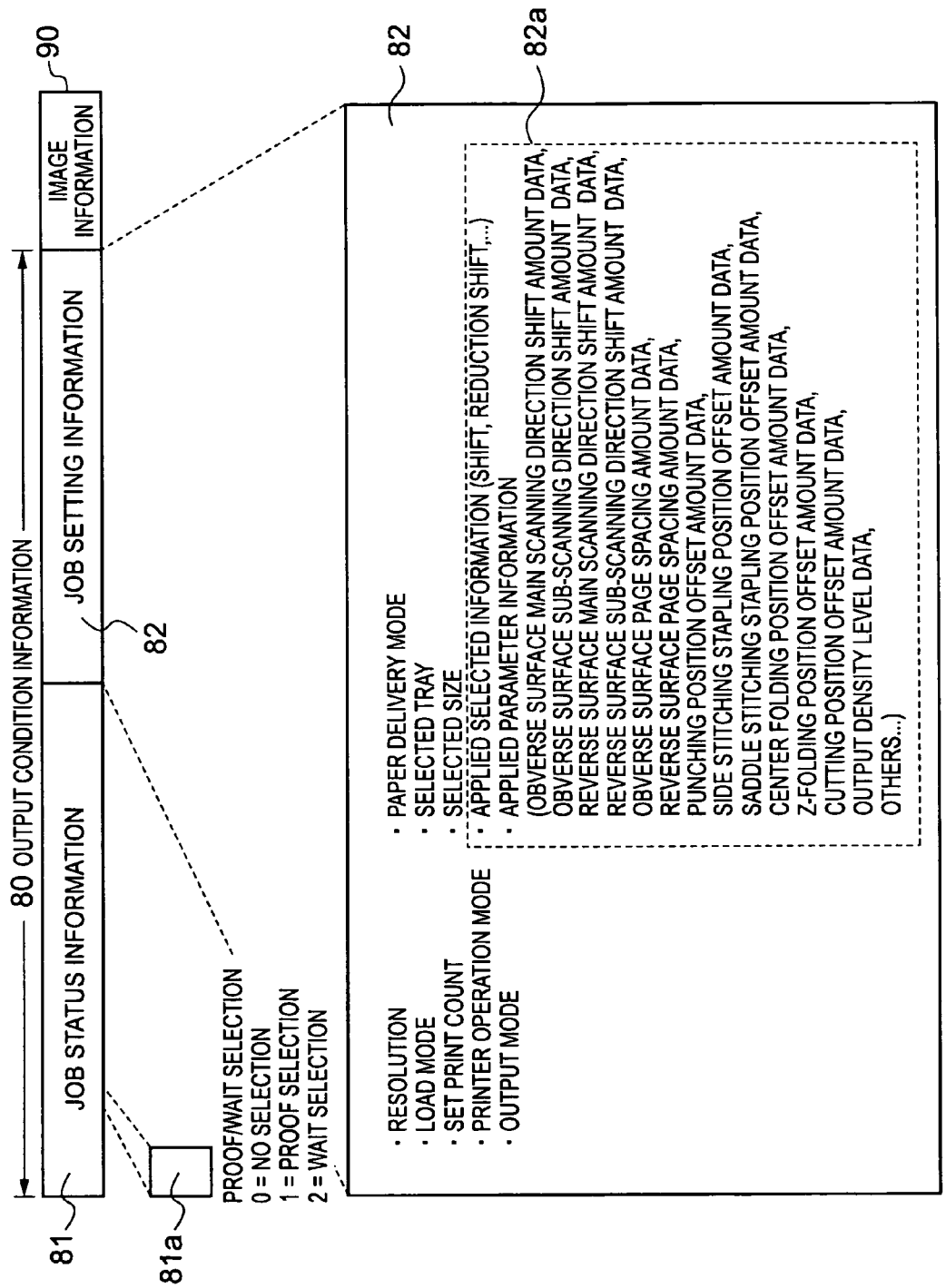

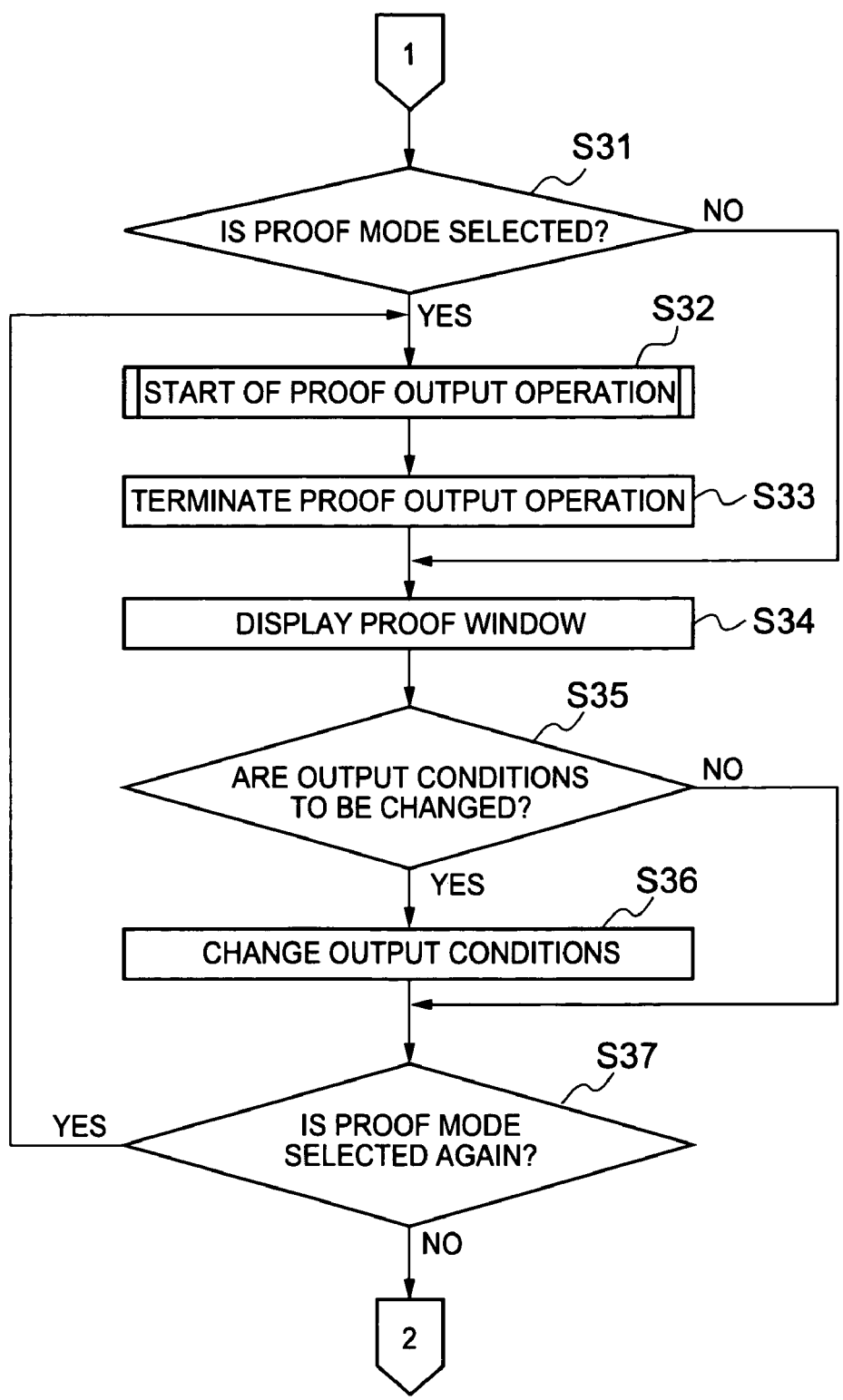

IMAGE PRINTING SYSTEM, IMAGE PRINTING APPARATUS, AND IMAGE PRINTING METHOD

BACKGROUND OF THE INVENTION

1. Field of the Invention

The present invention relates to an image printing system, image printing apparatus, and image printing method which can be suitably applied to a system designed to make a plurality of copying machines, multifunction apparatuses, printers, or the like, each having an electrophotographic image printing function, share and concurrently process an image printing job for outputting a plurality of prints, copies, or the like.

2. Description of the Prior Art

A conventional image printing system is formed by interactively connecting an image printing apparatus which receives image printing conditions and image information and serves as a master machine to an image printing apparatus which serves as a sub-machine to which the image printing conditions and image information are transferred from the master machine (e.g., pp. 2-3, and FIG. 3 in Japanese Unexamined Patent Publication No. 2002-127560).

In such an image printing system, when, for example, the master machine and the sub-machine share and concurrently process a printing job for outputting a plurality of prints, the master machine has a function of allowing selection of a proof mode of printing a single print as a proof output to check an output state by using the master machine.

When, for example, receiving an instruction to share a printing job with the sub-machine to concurrently process the job, and printing conditions and image information for the execution of the printing job, the master machine starts printing processing accompanying proof operation like that shown in the flow chart of FIG. 1.

Upon receiving printing conditions and image information, the master machine checks first, in accordance with the printing conditions, in step S111 in FIG. 1 whether or not printing operation is to be started in the proof mode. If printing operation is to be started in the proof mode (YES), the printing conditions are stored as job setting information in the storage area of the master machine in step S112.

Likewise, in step S113, proof execution information is recorded on the job status information stored in the storage area of the master machine. Lastly, in step S114, the output state of the master machine under the printing conditions stored in the storage area of the master machine is checked by executing proof output operation as check printing operation.

If printing operation is not to be started in the proof mode (NO in step S111), the flow advances to step S121 to check whether an instruction to execute proof output operation has been issued by checking whether proof execution information is recorded on the job status information stored in the storage area of the master machine. If no proof output operation is to be executed (NO), the flow advances to step S130 to transfer the printing conditions and image information to the sub-machine and execute final printing operation in order to output the set number of prints while sharing the printing operation with the sub-machine. Assume that proof output operation has already been executed (YES in step S121) and it is determined in step S122 that the printing conditions stored as job setting information in the storage area of the master machine differ from the printing conditions set as the current job setting information (YES). In this case, since printing conditions have already been set again, the flow advances to step S130 to transfer the printing conditions recorded as the current job setting information and the image information to the sub-machine and execute final printing operation.

If the job setting information stored in the storage area of the master machine does not differ from the current job setting information (NO in step S122), since the output state of a print obtained by proof output operation is good, the output print count is incremented by one in step S123. In step S124, the output print count is compared with the set print count. If the output print count is equal to the set print count (YES), since this printing job is complete, the flow advances to step S125 to terminate the printing job. If the output print count differs from the set print count (NO), the flow advances to step S130 to transfer the printing conditions and image information to the sub-machine and output the remaining number of prints concurrently with the sub-machine.

The following problems arise in the conventional image printing system.

1. Only the master machine can execute proof output operation in the proof mode, and the sub-machine outputs prints in accordance with the printing conditions and image information transferred from the master machine. If, therefore, the master machine and sub-machine differ in their mechanical characteristics or maintenance states, prints obtained by the master machine and that obtained by the sub-machine may differ in their output states. Even such differences are small, they cannot be allowed in a case wherein it is required to output a large amount of high-quality prints at high speed as in the POD (Print on Demand) market.

2. Since the output state of the sub-machine cannot be checked and printing conditions cannot be changed by the sub-machine, the output state of the sub-machine cannot be adjusted to match the output state of the master machine. For this reason, when it is required to output high-quality prints like those described above, it is difficult to concurrently process a printing job by using both the master machine and the sub-machine, resulting in a deterioration in the processing efficiency of the overall image printing system.

SUMMARY OF THE INVENTION

The present invention has been made to solve the above problems in the prior art, and has as its object to provide an image printing system, image printing apparatus, and image printing method which allow an even sub-machine to check image printing conditions and an output state, and also allow a master machine and the sub-machine to share and concurrently execute the operation of outputting equally high-quality prints.

In order to achieve the above object, according to the first aspect of the present invention, there is provided an image printing system which makes a plurality of image printing apparatuses share an image printing job for outputting a plurality of prints on the basis of arbitrary image printing conditions and image information, comprising: when image printing operation of outputting a single print based on the image printing job is defined as a proof mode, and image printing operation of displaying the image printing conditions and waiting without shifting to image printing processing is defined as a wait mode, a plurality of image printing apparatuses each having a proof/wait selection function of selecting either the proof mode or the wait mode, a communication unit which interactively connects the plurality of image printing apparatuses to each other, and an information processing apparatus which supplies arbitrary image printing conditions and image information to one image printing apparatus connected to the communication unit, wherein image printing operation based on the proof/wait selection function is executed by the one image printing apparatus to which image printing conditions and image information are supplied from the information processing apparatus, and the image printing conditions and image information are transferred from the one image printing apparatus to another image printing apparatus to cause another image printing apparatus which has received the transferred image printing conditions and image information to concurrently execute image printing operation based on the proof/wait selection function.

According to the image printing system of the first aspect described above, an image printing job for outputting a plurality of prints is executed by an arbitrary image printing apparatus defined as a main machine on the basis of the image printing conditions and image information supplied from the information processing apparatus in accordance with the proof/wait selection function. At the same time, image printing operation is concurrently executed by another image printing apparatus which has received the image printing conditions and image information transferred from the main machine and servers as a sub-machine in accordance with the proof/wait selection function. If it is unnecessary to check an output state and re-set image printing conditions by the sub-machine, the proof/wait selection function of the sub-machine is nullified by the selection nullifying switch provided for the sub-machine. This allows even the sub-machine to output a signal print in the proof mode and check an output state or change image printing conditions in the wait mode. If, therefore, both the main machine and the sub-machine are required to have equivalent output states, the sub-machine can adjust and re-set image printing conditions while checking the output state of the sub-machine by the proof/wait selection function. Since a plurality of image printing apparatuses can share printing operation and concurrently output high-quality prints in equivalent output states, the processing efficiency of an image printing job can be improved.

According to the second aspect of the present invention, there is provided an image printing system wherein another image printing apparatus described in the first aspect which has received the transferred image printing conditions and image information comprises a switch which switches whether or not a proof/wait mode of selecting a proof mode or a wait mode on the basis of the proof/wait selection function.

According to the third aspect of the present invention, in the image printing system described in the first or second aspect, when the one image printing apparatus which is connected to the communication unit and receives arbitrary image printing conditions and image information from the information processing apparatus is defined as a main machine, and another image printing apparatus which receives the image printing conditions and image information transferred from the one image printing apparatus is defined as a sub-machine, image printing operation based on the image printing job is started by the main machine, and part of the image printing job is allocated to not less than one sub-machine connected to the communication unit to cause each sub-machine to concurrently execute image printing operation based on the image printing job allocated from the main machine.

According to the fourth aspect of the present invention, there is provided an image printing system wherein another image printing apparatus described in the third aspect which serves as the sub-machine comprises a selection nullifying switch which nullifies the proof/wait selection function of selecting the proof mode or the wait mode.

According to the fifth aspect of the present invention, there is provided a first image printing apparatus which is connected to an interactive communication unit and shares an image printing job for outputting a plurality of prints on the basis of arbitrary image printing conditions and image information supplied from a host information processing apparatus, comprising, when image printing operation of outputting a single print based on the image printing job is defined as a proof mode, and image printing operation of displaying the image printing conditions and waiting without shifting to image printing processing is defined as a wait mode, an image printing unit which prints an image on the basis of a proof/wait selection instruction to select a proof mode or wait mode from the host information processing apparatus, wherein the image printing unit executes image printing operation based on image printing conditions, image information, and a proof/wait selection instruction supplied from the information processing apparatus, and transfers the image printing conditions and image information to another image printing apparatus.

According to the first image printing apparatus, when a sub-machine is to concurrently process an image printing job, together with the main machine, which is based on the image printing conditions and image information transferred from the main machine, the sub-machine also executes image printing operation based on a proof/wait selection instruction. At this time, image printing conditions are adjusted by the initial values of the output condition information stored in the memory unit of the sub-machine. If it is unnecessary for a sub-machine to check an output state and re-set image printing conditions, the proof/wait selection function of the sub-machine is nullified by the selection nullifying switch provided for the sub-machine. Since even an image printing apparatus which becomes a sub-machine upon receiving image printing conditions and image information transferred from an image printing apparatus serving as a main machine can execute image printing operation based on the proof/wait selection function, the sub-machine can output a single print in the proof mode, check an output state, and change image printing conditions in the wait mode. Even if a sub-machine is required to realize the same output state as that in the main machine, image printing conditions can be adjusted and re-set while an output state in the sub-machine is checked by the proof/wait selection function. This makes it possible to form prints in the same output state as that in the main machine.

Since the output state of a sub-machine can be automatically adjusted in accordance with the initial values of the output condition information stored in the memory unit of the sub-machine to become equivalent to that of the main machine, the setting efficiency of image printing conditions in the sub-machine can be improved. If it is unnecessary for the sub-machine to perform proof/wait selecting operation, this operation can be nullified by the selection nullifying switch provided for the sub-machine. This makes it possible to eliminate the stop time of the processing of a printing job by proof/wait selecting operation in the sub-machine. Only when the sub-machine is required to realize the same output state as in the main machine, image printing conditions can be adjusted and re-set while an output state is checked by the proof/wait selection function. This makes it possible to concurrently output prints with necessary and sufficient quality together with other image printing apparatuses without decreasing the processing efficiency of an image printing job.

According to the sixth aspect of the present invention, there is provided an image printing apparatus wherein the apparatus further comprises a memory unit which stores which output condition information for adjusting the image printing conditions described in the fifth aspect, and the image printing unit prints an image on the basis of the image printing conditions adjusted by the output condition information stored in the memory unit and the image information.

According to the seventh aspect of the present invention, there is provided an image printing apparatus wherein the output condition information described in the sixth aspect includes not less than one of image position information, postprocessing information, and density information.

According to the eighth aspect of the present invention, there is provided an image printing apparatus wherein the image position information described in the seventh aspect includes not less than one of obverse surface main scanning information, obverse surface sub-scanning information, reverse surface main scanning information, reverse surface sub-scanning information, obverse surface page spacing amount information, and reverse surface page spacing amount information of an image printing position.

According to the ninth aspect of the present invention, there is provided an image printing apparatus wherein the postprocessing information described in the seventh aspect includes not less than one of punching position information, stapling position information, folding position information, and cutting position information.

According to the 10th aspect of the present invention, there is provided an image printing apparatus wherein the density information described in the seventh aspect includes density data of not less than one color of fundamental colors including yellow (Y), magenta (M), cyan (C), and black (K).

According to the 11th aspect of the present invention, the image printing apparatus described in the sixth aspect further comprises a selection nullifying switch which nullifies a proof/wait selection function of selecting the proof mode or the wait mode, and when the proof/wait selection function is nullified by the selection nullifying switch, adjustment of the image printing conditions based on output condition information stored in the memory unit is not executed.

According to the 12th aspect of the present invention, there is provided a second image printing apparatus which can be connected to an interactive communication unit, comprising an image printing unit, and a control unit which controls input/output operation of the image printing unit, wherein one image printing apparatus to which arbitrary image printing conditions and image information are supplied is defined as a main machine, another image printing apparatus which receives image printing conditions and image information transferred from the main machine is defined as a sub-machine, and when an image printing job is started by the main machine, and part of the image printing job is allocated to not less than the one sub-machine connected to the communication unit to make the respective sub-machines concurrently execute image printing operation based on the allocated image printing job, the control unit performs control to switch whether to make the sub-machine execute image printing operation under the image printing conditions allocated from the main machine or under image printing conditions uniquely held by the sub-machine.

According to the second image printing apparatus, when the sub-machine is to concurrently execute image printing operation based on the image printing conditions and image information transferred from the main machine, the control unit switches whether to use the image printing conditions allocated as output conditions for the sub-machine by the main machine or to use the image printing conditions uniquely held by the sub-machine. Even if, therefore, the main machine and sub-machine differ in their output states, since control can be performed to switch the image printing conditions used as output conditions to image printing conditions unique to the sub-machine, the output state of the sub-machine can be automatically adjusted to become equivalent to that of the main machine by using the image printing conditions uniquely held by the sub-machine. For this reason, an image printing job can be quickly executed under the automatically adjusted output conditions, and hence the availability of the apparatus improves.

According to the 13th aspect of the present invention, there is provided an image printing apparatus wherein when the control unit switches to cause the sub-machine described in the 12th aspect to execute image printing operation under the image printing conditions allocated from the main machine, the image printing conditions allocated from the main machine include not less than one of image position information, postprocessing information, and density information.

According to the 14th aspect of the present invention, there is provided an image printing apparatus wherein the image position information described in the 13th aspect includes not less than one of obverse surface main scanning information, obverse surface sub-scanning information, reverse surface main scanning information, reverse surface sub-scanning information, obverse surface page spacing amount information, and reverse surface page spacing amount information of an image printing position.

According to the 15th aspect of the present invention, there is provided an image printing apparatus wherein the postprocessing information described in the 13th aspect includes not less than one of punching position information, stapling position information, folding position information, and cutting position information.

According to the 16th aspect of the present invention, there is provided an image printing apparatus wherein the density information described in the 13th aspect includes density data of not less than one color of fundamental colors including yellow (Y), magenta (M), cyan (C), and black (K)

According to the 17th aspect of the present invention, there is provided an image printing apparatus wherein when the control unit switches to cause the sub-machine described in the 12th aspect to execute image printing operation under the image printing conditions uniquely held by the sub-machine, the image printing conditions uniquely held by the sub-machine include not less than one of image position information, postprocessing information, and density information.

According to the 18th aspect of the present invention, there is provided an image printing apparatus wherein the image position information described in the 17th aspect includes not less than one of obverse surface main scanning information, obverse surface sub-scanning information, reverse surface main scanning information, reverse surface sub-scanning information, obverse surface page spacing amount information, and reverse surface page spacing amount information of an image printing position.

According to the 19th aspect of the present invention, there is provided an image printing apparatus wherein the postprocessing information described in the 17th aspect includes not less than one of punching position information, stapling position information, folding position information, and cutting position information.

According to the 20th aspect of the present invention, there is provided an image printing apparatus wherein the density information described in the 17th aspect includes density data of not less than one color of fundamental colors including yellow (Y), magenta (M), cyan (C), and black (K).

According to the 21st aspect of the present invention, there is provided an image printing method of making a plurality of image printing apparatuses share an image printing job for outputting a plurality of prints on the basis of arbitrary image printing conditions and image information, comprising the steps of, when image printing operation of outputting a single print based on the image printing job is defined as a proof mode, and image printing operation of displaying the image printing conditions and waiting without shifting to image printing processing is defined as a wait mode, providing a proof/wait selection function of selecting either the proof mode or the wait mode for each of the plurality of image printing apparatuses, connecting the plurality of image printing apparatuses, each of which is provided with the proof/wait selection function, to an interactive communication unit, supplying arbitrary image printing conditions and image information to one of the image printing apparatuses connected to the communication unit, executing image printing operation based on the proof/wait selection function by using one of the image printing apparatuses to which the image printing conditions and image information are supplied, and transferring the image printing conditions and image information to another image printing apparatus, and executing image printing operation based on the proof/wait selection function by using another image printing apparatus which has received the transferred image printing conditions and image information.

According to the 22nd aspect of the present invention, there is provided an image printing method wherein when the one image printing apparatus which is connected to the communication unit described in the 21st aspect and receives arbitrary image printing conditions and image information is defined as a main machine, and another image printing apparatus which receives the image printing conditions and image information transferred from the image printing apparatus serving as the main machine is defined as a sub-machine, image printing operation based on the image printing job is started by the main machine, and part of the image printing job is allocated to not less than one sub-machine connected to the communication unit to cause each sub-machine to concurrently execute the image printing job allocated from the main machine.

According to the image printing method of the 21st aspect, since even an image printing apparatus which becomes a sub-machine upon receiving the image printing conditions and image information transferred from an image printing apparatus serving as a main machine upon receiving image printing conditions and image information from the information processing apparatus can execute image printing operation based on the proof/wait selection function, the sub-machine can also output a single print in the proof mode to check its output state and change image printing conditions in the wait mode. If, therefore, both the main machine and the sub-machine are required to have equivalent output states, the sub-machine can adjust and re-set image printing conditions while checking the output state of the sub-machine by the proof/wait selection function. Therefore, a plurality of image printing apparatuses can share printing operation and concurrently output high-quality prints in equivalent output states.

As is obvious from the respective aspects described above, the present invention can be suitably applied to a system in which a plurality of copying machines, multifunction apparatuses, printers, or the like, each having an electrophotographic image printing function, share and concurrent process an image printing job for outputting a plurality of prints, copies, or the like.

BRIEF DESCRIPTION OF THE DRAWINGS

FIGS. 4A to 4C are schematic views each showing the second display example of the setting check window based on the proof/wait selection function in the image printing apparatus shown in FIG. 2;

FIGS. 5A to 5C are schematic views each showing the third display example of the setting check window based on the proof/wait selection function in the image printing apparatus shown in FIG. 2;

FIGS. 6A to 6C are schematic views each showing the fourth display example of the setting check window based on the proof/wait selection function in the image printing apparatus shown in FIG. 2;

FIG. 7 is a conceptual view showing an example of the arrangement of output condition information of an image printing job executed by an image printing apparatus;

FIGS. 9-1 and 9-2 are flow charts showing an example of printing processing by an image printing apparatus (master machine); and FIGS. 10-1 and 10-2 are flow charts showing an example of printing processing by an image printing apparatus (sub-machine).

DETAILED DESCRIPTION OF THE PREFERRED EMBODIMENT

Figure 2:
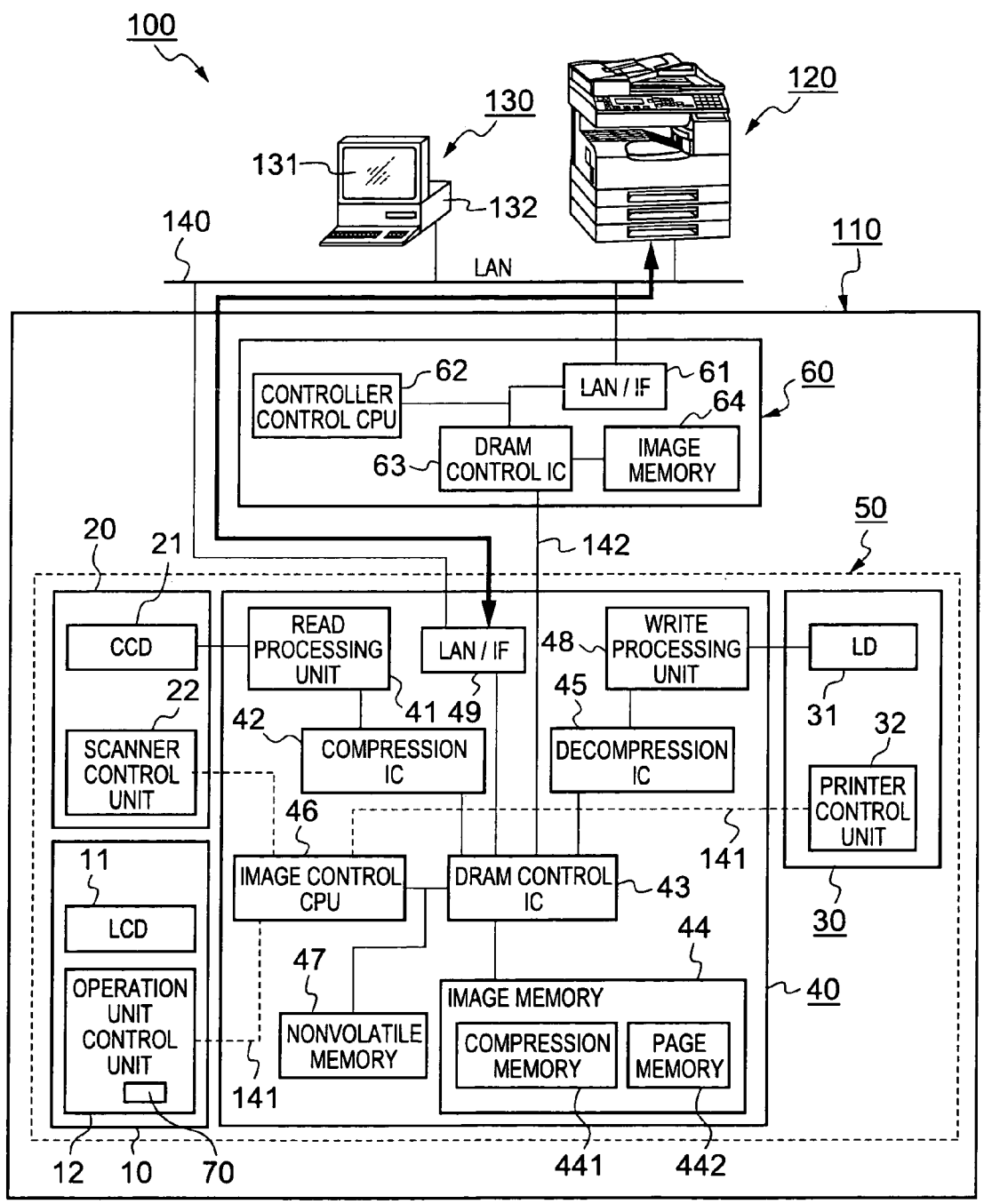
FIG. 2 is a conceptual view showing the schematic overall arrangement of an image printing system according to an embodiment of the present invention.

An image printing system, image printing apparatus, and image printing method according to a preferred embodiment of the present invention will be described below with reference to the accompanying drawings. FIG. 2 is a conceptual view of an example of the arrangement of an image printing system 100 according to an embodiment of the present invention.

In an embodiment of the present invention, a plurality of image printing apparatuses are interactively connected to each other and share and concurrently execute an image printing job for outputting a plurality of prints on the basis of the image printing conditions and image information supplied from a host information processing apparatus or the like. Each of these apparatuses has a proof/wait selection function. Each apparatus executes image printing operation in accordance with the proof mode of outputting a single print or the wait mode of waiting while displaying image printing conditions, and transfers image printing conditions and image information to the other image printing apparatus.

With this operation, the image printing apparatus which receives the transferred image printing conditions and image information and serves as a sub-machine can also execute image printing operation based on the proof/wait selection function.

The image printing system 100 shown in FIG. 2 is a system which can make a plurality of image printing apparatuses each having the proof/wait selection function share and concurrently process an image printing job for outputting a plurality of prints on the basis of the image printing conditions and image information supplied from the information processing apparatus. The image printing system 100 can be suitably applied to a system which makes a plurality of copying machines, multifunction apparatuses, printers, or the like, each having an electrophotographic image printing function, share and concurrently process an image printing job for outputting a plurality of prints, copies, or the like.

In the image printing system 100, digital multifunction copying machines 110 and 120, each having an image printing function, and a terminal 130 serving as an information processing apparatus are connected to each other through a LAN (Local Area Network) 40 serving as an interactive communication unit.

Each of the digital multifunction copying machines 110 and 120 is an example of an image printing apparatus. As shown in FIG. 2, the digital multifunction copying machine 110 is comprised of a digital copying main body 50 having an electrophotographic image printing function and a print/scanner controller 60 functioning as an image processing unit.

The digital copying main body 50 is comprised of an operation unit 10, a scanner unit 20 functioning as an image reading unit, a printer unit 30 functioning as an image printing unit, and a control unit 40 which controls them.

The operation unit 10 is comprised of an LCD (Liquid Crystal Display) 11 and operation unit control unit 12. The operation unit 10 is a touch panel type user interface designed to make various kinds of settings and perform information input operation through the operation unit control unit 12 when setting item buttons, numeral buttons, and the like displayed on the LCD 11 are operated by being pressed. The operation unit control unit 12 has a switch 70. The operator can nullify the proof/wait selection function by using the switch 70.

The scanner unit 20 is comprised of a solid-stage image sensing device 21 formed from a CCD (Charge Coupled Device) and scanner control unit 22. The scanner unit 20 is controlled by the scanner control unit 22 to read arbitrary image information by using the CCD 21 in accordance with an instruction input through the operation unit 10.

The printer unit 30 is comprised of an LD (Laser Diode) 31 and printer control unit 32. The printer unit 30 is controlled by the printer control unit 32 to expose an image based on arbitrary image information on a photosensitive drum (not shown) by using a laser beam emitted from the LD 31.

The control unit 40 is comprised of a read processing unit 41, compression IC (Integrated Circuit) 42, DRAM (Dynamic Random Access Memory) control IC 43, image memory 44, decompression IC 45, image control CPU (Central Processing Unit) 46, nonvolatile memory 47, write processing unit 48, and LAN/IF (InterFace) 49. The control unit 40 predominantly controls the digital copying main body including the operation unit 10, scanner unit 20, and printer unit 30.

The read processing unit 41 is connected to the CCD 21 to convert image information input as an electrical signal from the CCD 21 into digital information. The compression IC 42 is connected to the read processing unit 41 to compress digitized arbitrary image information input through the read processing unit 41.

The DRAM control IC 43 is connected to the compression IC 42 and is also connected to the image memory 44, decompression IC 45, image control CPU 46, and nonvolatile memory 47. Under the control of the image control CPU 46, the DRAM control IC 43 controls the image memory 44 to store, in the image memory 44, image information compressed by the compression IC 42 and to read out image information from the image memory 44 and send the information to the decompression IC 45.

The image memory 44 is a DRAM connected to the DRAM control IC 43 and includes a compression memory 441 and page memory 442. The image memory 44 functions as a work area for the compression IC 42, decompression IC 45, and image control CPU 46. The compression memory 441 stores image information compressed by the compression IC 42. The page memory 442 stores page information for reconstructing image information compressed by the compression IC 42.

The decompression IC 45 is connected to the DRAM control IC 43 and write processing unit 48 to acquire image information and page information read out from the image memory 44 through the DRAM control IC 43. The decompression IC 45 also reconstructs image information compressed by the compression IC 42 on the basis of page information and sends the resultant information to the write processing unit 48.

The image control CPU 46 is connected to the DRAM control IC 43 and nonvolatile memory 47 and is also interactively connected to the operation unit control unit 12, scanner control unit 22, and printer control unit 32 through a serial communication device 141 complying with the RS232 standards. The image control CPU 46 controls the scanner control unit 22, printer control unit 32, and DRAM control IC 43 in accordance with operation instructions input through the operation unit control unit 12 while referring to various programs and information stored in the nonvolatile memory 47 as needed, thereby controlling the overall digital copying main body 50.

The nonvolatile memory 47 is connected to both the DRAM control IC 43 and the image control CPU 46 and stores various kinds of programs and information which are required by the DRAM control IC 43 and image control CPU 46 in computation processing.

The write processing unit 48 is connected to the decompression IC 45 and LD 31. The write processing unit 48 converts arbitrary image information input from the decompression IC 45 into a control signal for causing the LD 31 to emit a laser beam so as to expose an image based on the image information on the photosensitive drum (not shown).

The LAN/IF 49 is an interface for connecting the digital copying main body 50 to a LAN to interactively connect the digital copying main body 50 to the information processing apparatus 130, the digital multifunction copying machine 120, and other image printing apparatuses (not shown). As the LAN/IF 49, an Ethernet(R) port complying with the IEEE802.3 standard or the like is used.

The print/scanner controller 60 is comprised of a LAN/IF 61, controller control CPU 62, DRAM control IC 63, and image memory 64, and functions as an image processing unit.

The LAN/IF 61 is an interface for connecting the print/scanner controller 60 to a LAN to interactively connect the print/scanner controller 60 to the terminal 130, the digital multifunction copying machine 120, and other image printing apparatuses (not shown). Like the LAN/IF 49, as the LAN/IF 61, an Ethernet(R) port complying with the IEEE802.3 standard or the like is used.

The controller control CPU 62 is connected to the LAN/IF 61 and DRAM control IC 63 to convert image information externally input through the LAN/IF 61 or image information input from the digital copying main body 50 through the DRAM control IC 63 into bitmapped digital data, as needed. The controller control CPU 62 converts the primary colors of these pieces of image information from the RGB format to the YMCK format while performing color tone correction processing, and sends out the resultant image information to the DRAM control IC 63.

The DRAM control IC 63 is connected to the controller control CPU 62 and image memory 64, and is also interactively connected to the DRAM control IC 43 of the digital copying main body 50 through a PCI (Peripheral Component Interconnect) bus 142. The DRAM control IC 63 controls writing and reading image information image-processed by the controller control CPU 62 and image information input through the DRAM control IC 43 to and from the image memory 64, and also controls sending image information image-processed by the controller control CPU 62 to the DRAM control IC 43.

The image memory 64 is connected to the DRAM control IC 63 and temporarily stores image information before and after image processing by the controller control CPU 62 to serve as a work area for the controller control CPU 62.

The digital multifunction copying machine 190 has the same arrangement as that of the digital multifunction copying machine 110 described above, and incorporates a digital copying main body 50 having an electrophotographic image printing function and switch 70.

The information processing apparatus 130 is a workstation or the like which is interactively connected to the digital multifunction copying machines 110 and 120 and other image printing apparatuses (not shown) through the LAN 140. The information processing apparatus 130 is comprised of a display unit 131 having an image display function like an LCD, and a main body 132 having an information processing function realized by a CPU, ROM (Read Only Memory), DRAM, and other memories and an operation unit for the information processing function. The information processing apparatus 130 is an information input terminal for supplying image printing conditions and image information to an arbitrary image printing apparatus of a plurality of image printing apparatuses including the digital multifunction copying machines 110 and 120.

The LAN 140 is a communication unit which interactively connects a plurality of image printing apparatuses (not shown) including the digital multifunction copying machines 110 and 120 to the information processing apparatus 130. More specifically, the LAN 140 is a network for information communication which is formed from an Ether cable such as 10BASE-T or the like complying with the IEEE802.3 standard.

Figure 3A:
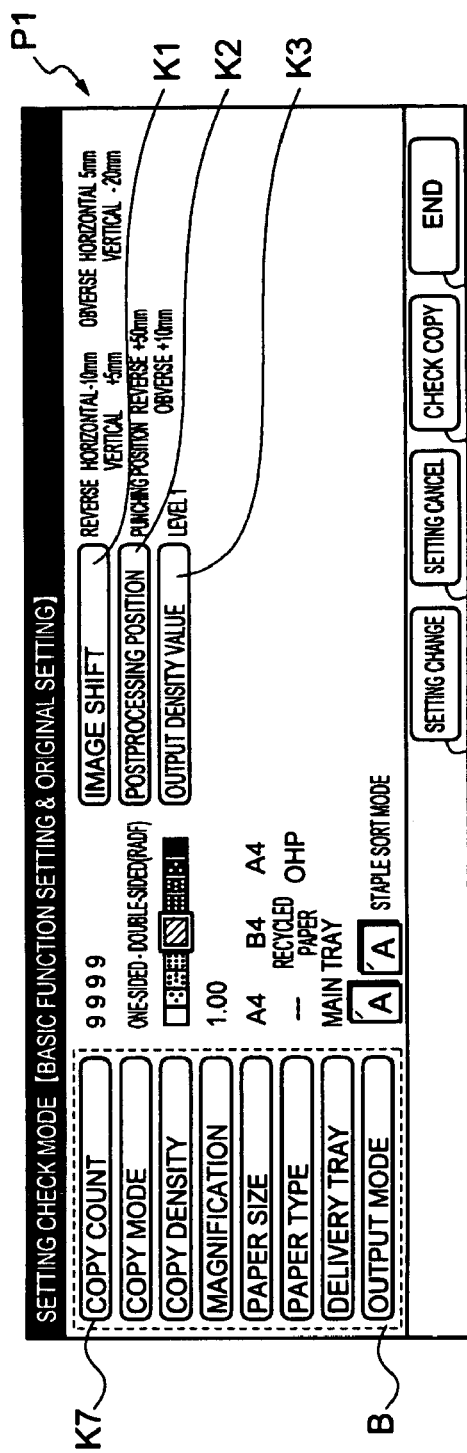
FIGS. 3A and 3B are schematic views each showing the first display example of a setting check window based on a proof/wait selection function in the image printing apparatus shown in FIG. 2.
Figure 3B:
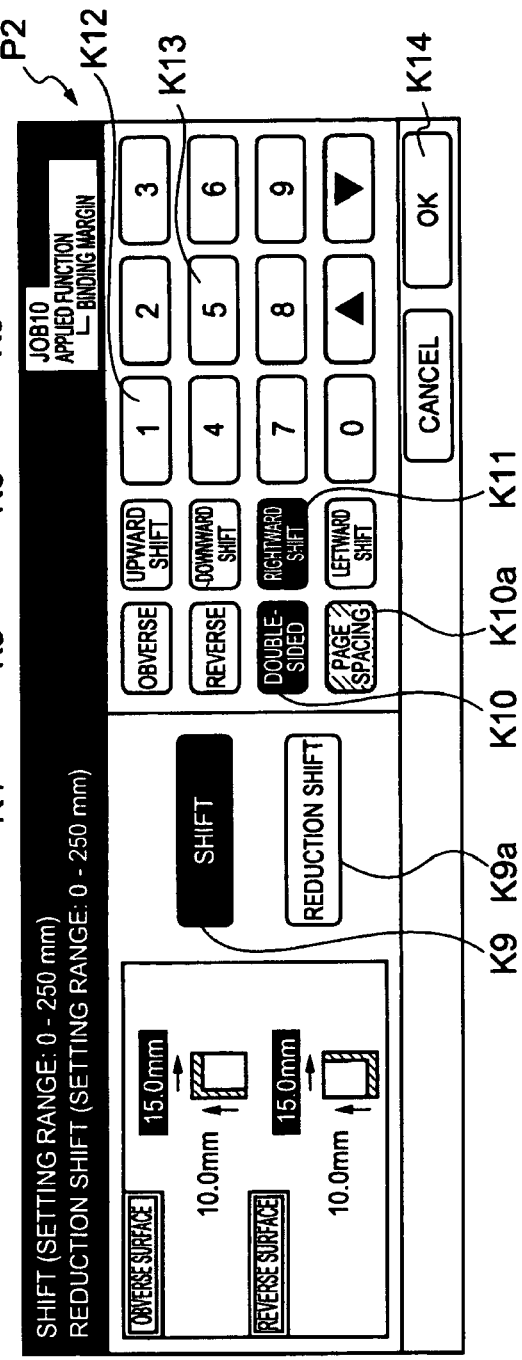

For example, as shown in FIGS. 3A and 3B, each of the digital multifunction copying machines 110 and 120 has the proof/wait selection function. When, for example, the digital multifunction copying machine 110 receives image printing conditions and image information from the information processing apparatus 130 and serves as a main machine (master machine), a "setting check" window P1 in the wait mode of the proof/wait selection function is displayed, as shown in FIG. 3A, on the display unit 131 of the information processing apparatus 130 and on the LCD 11 of the operation unit 10 of the master machine 110. With this operation, the master machine 110 predominantly controls an image printing job for outputting a plurality of prints on the basis of the image printing conditions and image information supplied from the information processing apparatus 130. This image printing job is controlled by operation through the main body 132 of the information processing apparatus 130 or the operation unit 10 of the master machine 110.

The buttons B arranged on the left side of the "setting check" window P1 are operation display buttons similar to those in a conventional digital multifunction apparatus. On the right side of each button, a supplied image printing condition is displayed numerically or graphically. Assume that a given image printing condition is to be changed. In this case, when the corresponding button is selected, the display switches to a detail setting window for the item displayed at the button to allow the operator to change the detail setting of the image printing condition.

An "image shift" key K1, "postprocessing position" key K2, and "output density value" key K3 arranged on the right side of the "setting check" window P1 are buttons to shift to setting windows for image shifts, postprocessing position, and output density value, respectively. On the right sides of the respective buttons, the numerical values automatically set by the initial values of the output printing information stored in the nonvolatile memory 47 are displayed. This allows the operator to check the image printing conditions supplied from the information processing apparatus 130 and the details of the initial values of the output condition information stored in the nonvolatile memory 47 with the displayed contents on the "setting check" window P1.

The set values for image shifts which are displayed on the right side of the "image shift" key K1 are the initial values of the image position information stored as one item of output condition information in the nonvolatile memory 47. This image position information includes obverse surface main scanning information, reverse surface main scanning information, obverse surface sub-scanning information, reverse surface sub-main scanning information, obverse surface page spacing amount information, and reverse surface page spacing amount information. The obverse surface main scanning information and reverse surface main scanning information are offset amounts which are referred to when images are to be printed on a sheet, and the image printing positions on the obverse and reverse surfaces of the sheet are to be shifted from an end of the sheet in the horizontal direction. Likewise, the obverse surface sub-main scanning information and reverse surface sub-main scanning information are offset amounts which are referred to when the image printing positions on the obverse and reverse surfaces of the sheet are shifted from an end of the sheet in the vertical direction. The obverse surface page spacing amount information and reverse surface page spacing amount information are the initial values of the spacing amounts between pages printed to be printed on the obverse and reverse surfaces of a sheet when images corresponding to a plurality of pages are to be formed on one sheet.

When, for example, the "image shift" key K1 is selected in the "setting check" window P1, the display switches to an "image shift setting" window P2 like that shown in FIG. 3B. This allows the operator to change the image shift amounts automatically set as the initial values of the image position information. Assume that a "shift" key K9, "double-sided" key K10, and "right shift" key K11 are selected, and a "1" key K12 and "5" key K13 are sequentially selected from the ten-key pad for inputting numerical values. In this case, the set values are changed such that the positions of images to be printed on a sheet are shifted to the right by 15 mm on the obverse surface of the sheet and to the left by 15 mm on the reverse surface.

This makes it possible to set detailed values for image shifts while checking the shift amounts of images to be printed on the sheet with both graphical and numerical displays. When images corresponding to a plurality of pages are to be printed on one sheet, a "reduction shift" key K9a and "page spacing" key K10a are selected, and a numerical value as a page spacing is input by using the ten-key pad for inputting numerical values. After the image shift settings are changed, an "OK" key K14 is selected, and the display returns to the "setting check" window P1 in FIG. 3A.

In the "setting check" window P1, the set values displayed on the right side of the "postprocessing position" key K2 are the initial values of the postprocessing information stored as one item of the output condition information in the nonvolatile memory 47. These values are positioning information required for punch (hole formation) processing, staple (binding) processing, folding processing, or cutting processing to be performed on a sheet on which an image is printed.

When the "postprocessing position" key K2 is selected in the "setting check" window P1, the display switches to one of "postprocessing position setting" windows P3 to P10. If, for example, the operator inputs desired set values in the "saddle stitching stopper position setting" window P3 shown in FIG. 4A by using the ten-key pad for inputting. numerical values, the input values displayed on the upper left end of the window are changed. When a "setting" key K15 is selected, the numerical values of the set values displayed on the right of the input values are changed to the same values of the input values. This allows the operator to change the positioning stopper position, which is used to saddle-stitch sheets on which images are printed, while checking the input values and set values.

After the saddle stitching stopper position is set/changed, the operator selects a "next item" key K16 to set desired values, in the same manner as described above, in the "vertical punching position setting" window P4 shown in FIG. 4B, the "horizontal punching position setting" window P5 shown in FIG. 4C, the "center folding stopper position setting" window P6 shown in FIG. 5A, the "cutting stopper position setting" window P7 shown in FIG. 5B, the "Z-folding stopper position setting" window P8 shown in FIG. 5C, the "vertical side stitching stapling position setting" window P9 shown in FIG. 6A, and the "horizontal side stitching stapling position setting" window P10 shown in FIG. 6B. In this manner, the position information required for these types of postprocessing can be changed from the automatically set initial values of postprocessing information. When necessary changes to the postprocessing positions are complete, a "previous window" key K17 is selected to return to the "setting check" window P1 in FIG. 3A.

The set value displayed on the right side of the "output density value" key K3 is the initial value of the density information stored as one item of the output condition information in the nonvolatile memory 47. This value is the density data of each of the fundamental colors, i.e., C (Cyan), M (magenta), Y (Yellow), and K (Black), used to print an image.

When the "output density value" key K3 is selected, the display switches to a "density level setting" window P11 shown in FIG. 6C. This allows the operator to change the density level of cyan (C) automatically set from the initial value of density information stored in the nonvolatile memory 47. When the density level of another fundamental color is to be changed, the "next page" key K16 is operated to switch the display to a "density level setting" window for magenta (M), yellow (Y), or black (K) (not shown), and the density level is changed to a desired density level for the corresponding color. This makes it possible to re-set the density level of each fundamental color automatically set from the initial value of density information for each color. After re-setting of density levels is complete, the "previous window" key K17 is selected to return to the "setting check" window P1 in FIG. 3A.

When the set values of the image shifts, postprocessing positions, and output density values, which are set by the above changing operation, are confirmed by selecting a "setting change" key K4 in the "setting check" window P1, and a "check copy" key K6 is selected, the current mode switches to the proof mode to make the digital multifunction copying machine 110 output only one of prints based on the changed image shifts, postprocessing positions, and output density values. In this case, the numerical value displayed on the right side of a "copy count" key K7 is decremented by 1.

If the output state of the print output in the proof mode is sufficiently good, an "end" key K8 is selected to start the image printing job. If the output state of the print output in the proof mode is not good, the output condition information is changed again in the above manner. When the output state of a print is to be checked by using the initial values of the output condition information stored in the nonvolatile memory 47, a "setting cancel" key K5 is selected to return all the set values to the initial values of the output condition information. When the "check copy" key K6 is repeatedly selected, output condition information by which a good output state can be obtained is confirmed by selecting the "setting change" key K4, and the "copy count" key K7 is selected to input a correct copy count again. Thereafter, the "end" key K8 is selected to start the image printing job.

This makes it possible to check the initial values of the output condition information stored in the nonvolatile memory 47 in the wait mode and to set the initial values of the output condition information again by arbitrarily changing them. In addition, this allows the operator to change the output condition information so as to obtain a sufficiently good output state while checking the output state of a print based on the initial values or re-set values of the output condition information in the proof mode.

The digital multifunction copying machine 110 executes by itself, as the master machine 110, the image printing job in accordance with the output condition information, based on which the output state has been checked in this manner, and transfers the output condition information including the image printing condition supplied from the information processing apparatus 130 to the digital multifunction copying machine 120, together with the image information. This allows the digital multifunction copying machine 120 to serve as the sub-machine 120 so as to share and concurrently execute the image printing job.

As shown in FIG. 7, the output condition information transferred from the master machine 110 to the sub-machine 120 is attached to image information 90 as header information 80 constituted by job status information 81 and job setting information 82.

The job status information 81 includes part of the image printing condition supplied from the information processing apparatus 130 and a storage area 81a for information associated with the proof/wait selection function. When the proof/wait selection function is not be used in the sub-machine 120, flag "0" is set in the storage area 81a. When the proof mode is to be selected, flag "1" is set in the storage area 81a. When the wait mode is to be selected, flag "2" is set in the storage area 81a. This allows the master machine 110 to control the proof/wait selection function of the sub-machine 120. By using the master machine, the operator can choose between checking an output state and re-setting output condition information by using the proof/wait selection function of the digital multifunction copying machine 120 and immediately and concurrently executing the image printing job on the basis of the output condition information from the master machine without using the proof/wait selection function of the sub-machine as in the conventional image printing system. Therefore, the master machine 110 and sub-machine 120 can function as the first image printing apparatuses according to the present invention.

The job setting information 82 is constituted by various kinds of set conditions such as a resolution, read mode, set sheet count, printer operation mode, output mode, paper delivery mode, selected tray, and selected size which are included in the image printing conditions supplied from the information processing apparatus 130, applied selected information automatically set from the initial values of the output condition information stored in the nonvolatile memory 47 of the master machine 110, and applied parameter information 82a.

The applied selected information includes information concerning choices of image position information such as image shifts and reduction shifts shown in FIG. 3B. The applied parameter information includes, as the initial values of image position information, postprocessing information, and density information, obverse surface main scanning direction shift amount data, obverse surface sub-scanning direction shift amount data, reverse surface main scanning direction shift amount data, reverse surface sub-scanning direction shift amount data, obverse surface page spacing amount data, reverse surface page spacing amount data, punching position offset amount data, side stitching stapling position offset amount data, saddle stitching stapling position offset amount data, center folding position offset amount data, Z-folding position offset amount data, cutting position offset amount data, output density level data, and the like.

The data included in the applied selected information and applied parameter information 82a are loaded as default output condition information 47b unique to each of the digital multifunction copying machines 110 and 120 in nonvolatile stored information 47a stored in the nonvolatile memory 47 provided in each of the digital multifunction copying machines 110 and 120 at the time of shipment or periodic maintenance of each of the digital multifunction copying machines 110 and 120. The default output condition information 47b unique to each of the digital multifunction copying machines 110 and 120 is set to eliminate the difference in output state between the digital multifunction copying machines 110 and 120 due to their mechanical characteristics.

By replacing the applied selected information and applied parameter information 82a transferred from the master machine 110 with the default output condition information 47b stored in the nonvolatile memory 47, prints can be output by using the default output condition information 47b which is adjusted in advance to match the output state of the sub-machine 120 with that of the master machine 110. This makes it possible to easily eliminate the difference in output state between prints output from the master machine 110 and the sub-machine 120 due to their mechanical characteristics and maintenance states.

Assume that flags "1" and "2" are set in the storage area 81a for the job status information 81 transferred from the master machine 110, and the proof/wait selection function is to be used in the sub-machine 120. In this case, the "setting check" window P1 based on the proof/wait selection function shown in FIGS. 3A and 3B is displayed on the display unit 131 of the information processing apparatus 130 and on the LCD 11 of the digital multifunction copying machine 120 in the same manner as in the master machine 110.

At this time, since the output condition information for the sub-machine 120 is set by the master machine 110, the "setting cancel" key K5 is selected to replace the set values of the image position information, postprocessing information, and density information with the default output condition information 47b stored in the nonvolatile memory 47. This can eliminate the difference in output state between prints output from the master machine 110 and the sub-machine 120 due to their mechanical characteristics. Selecting the "check copy" key K6 and checking the output state of the sub-machine 120 using the default output condition information 47b in the proof mode can eliminate the difference in output state between the master machine 110 and the sub-machine 120 due to the difference in maintenance state therebetween.

The sub-machine 120 can nullify its own proof/wait selection function by using the switch 70 provided on the operation unit control unit 12, and can forcibly replace the output condition information (image printing conditions) allocated from the master machine 110 with the default output condition information 47b (image printing conditions) uniquely held in the sub-machine 120 (second image printing apparatus).

Even if, therefore, flag "0" is set in the storage area 81a for the job status information 81 transferred from the master machine 110 to inhibit the sub-machine 120 from using the proof/wait selection function, selection can be made to execute an image printing job by using the default output condition information 47b in the sub-machine 120. Assume that the mechanical characteristics and maintenance states of the master machine 110 and sub-machine 120 are sufficiently grasped in the image printing system 100. In this case, by switching the switch 70 of the sub-machine 120, an image printing job in the sub-machine 120 can be quickly executed upon selecting either the output condition information in the master machine 110 or the default output condition information 47b in the sub-machine 120.

Note that when priority is given to only the processing speed of an image printing job, an image printing job can be quickly and concurrently executed by the master machine 110 and sub-machine 120 by causing the information processing apparatus 130 to supply image printing conditions set to also inhibit the master machine 110 from using the proof/wait selection function.

Figure 8:
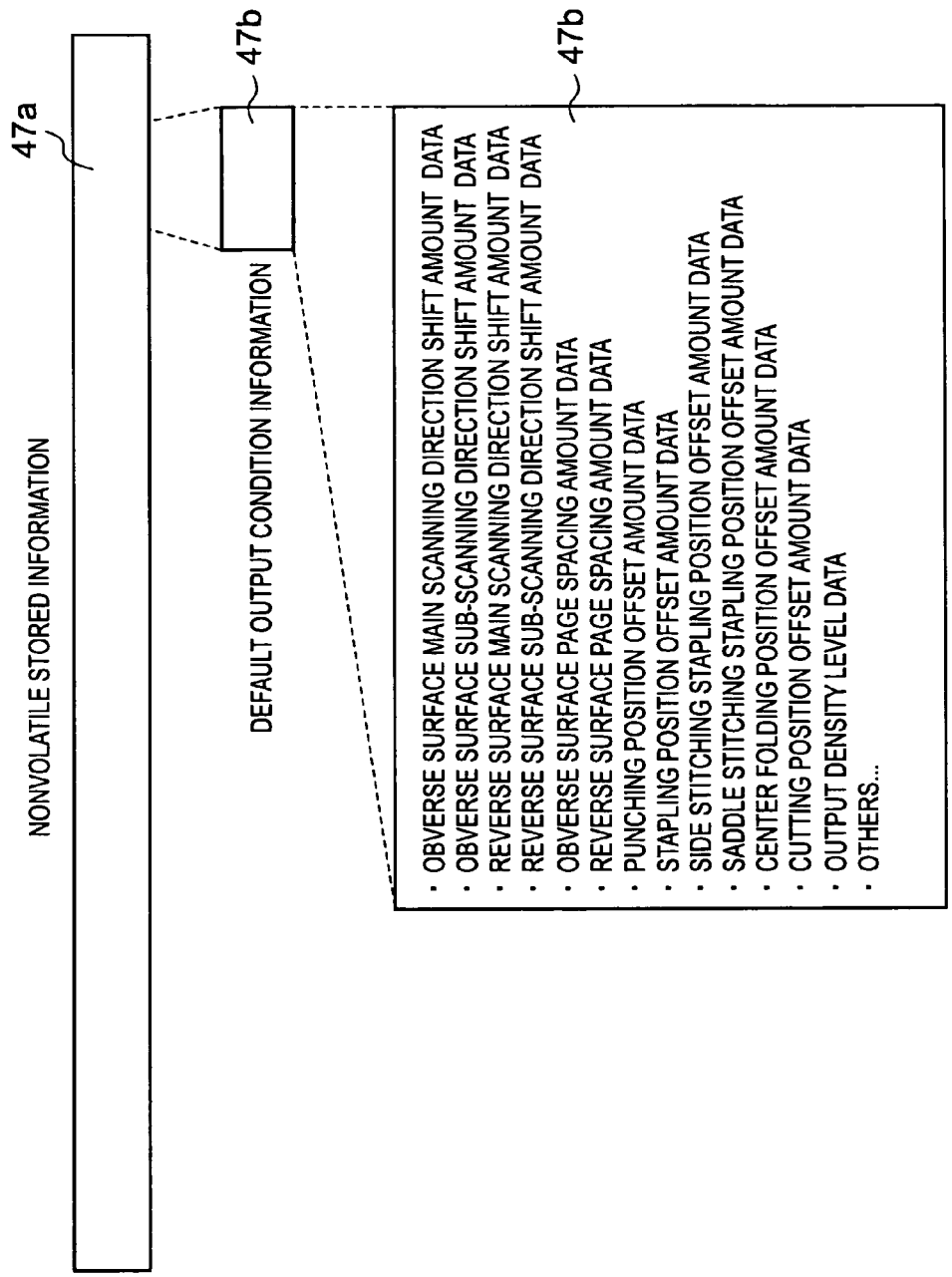
FIG. 8 is a conceptual view showing an example of the arrangement of output condition information stored in a non-volatile memory in the image printing apparatus.
Figures 1, 9:
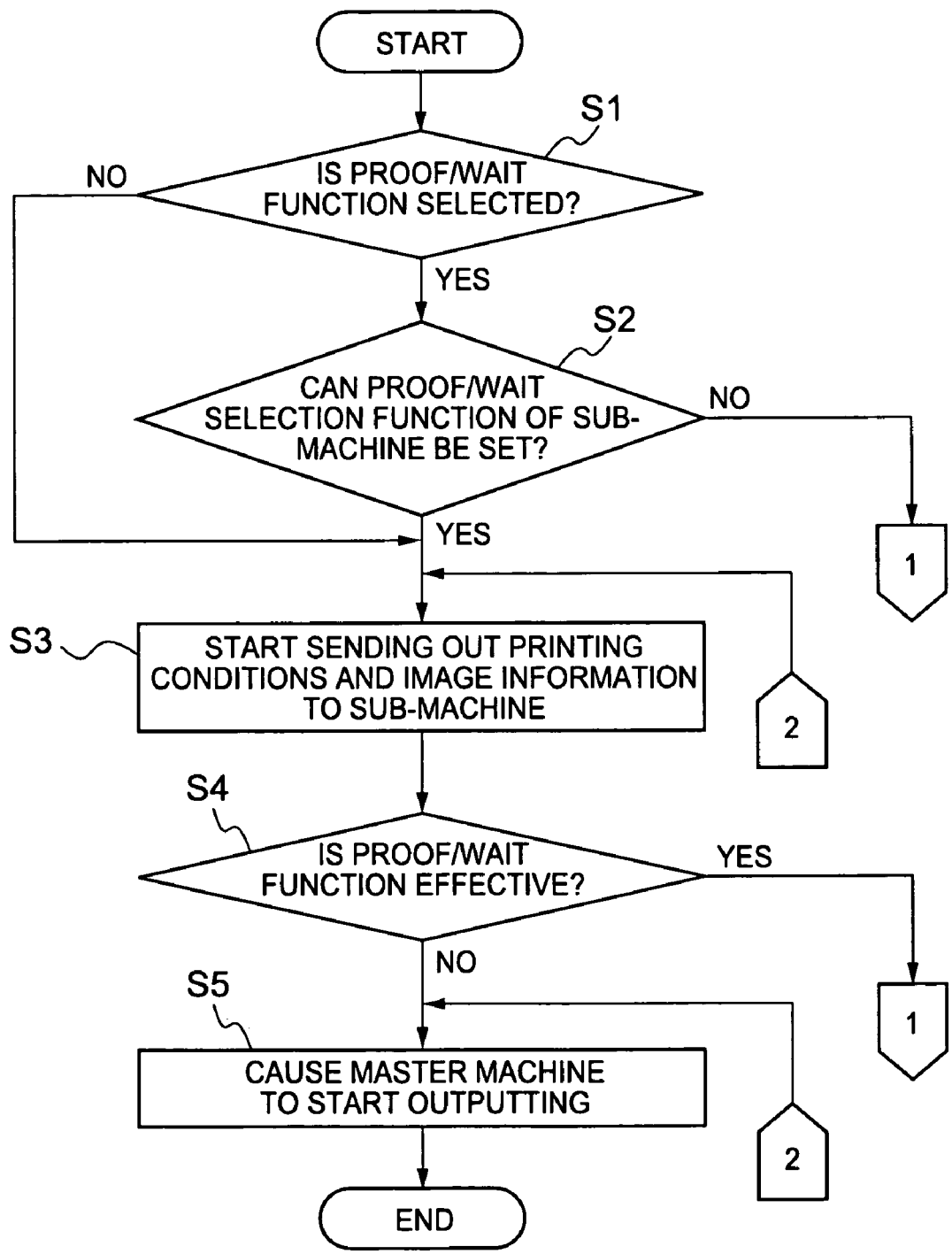
Figures 2, 9:
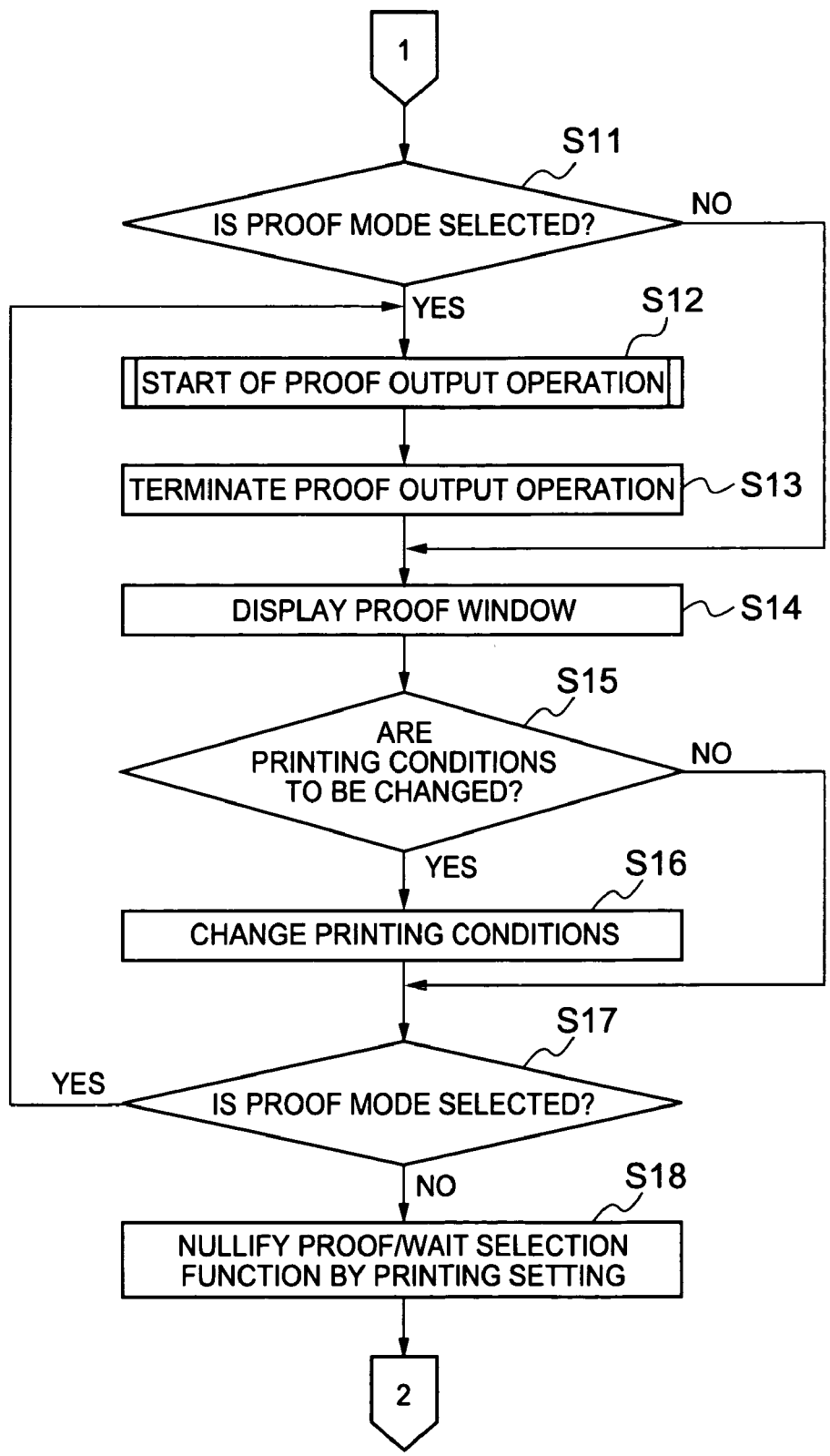
Figures 1, 10:
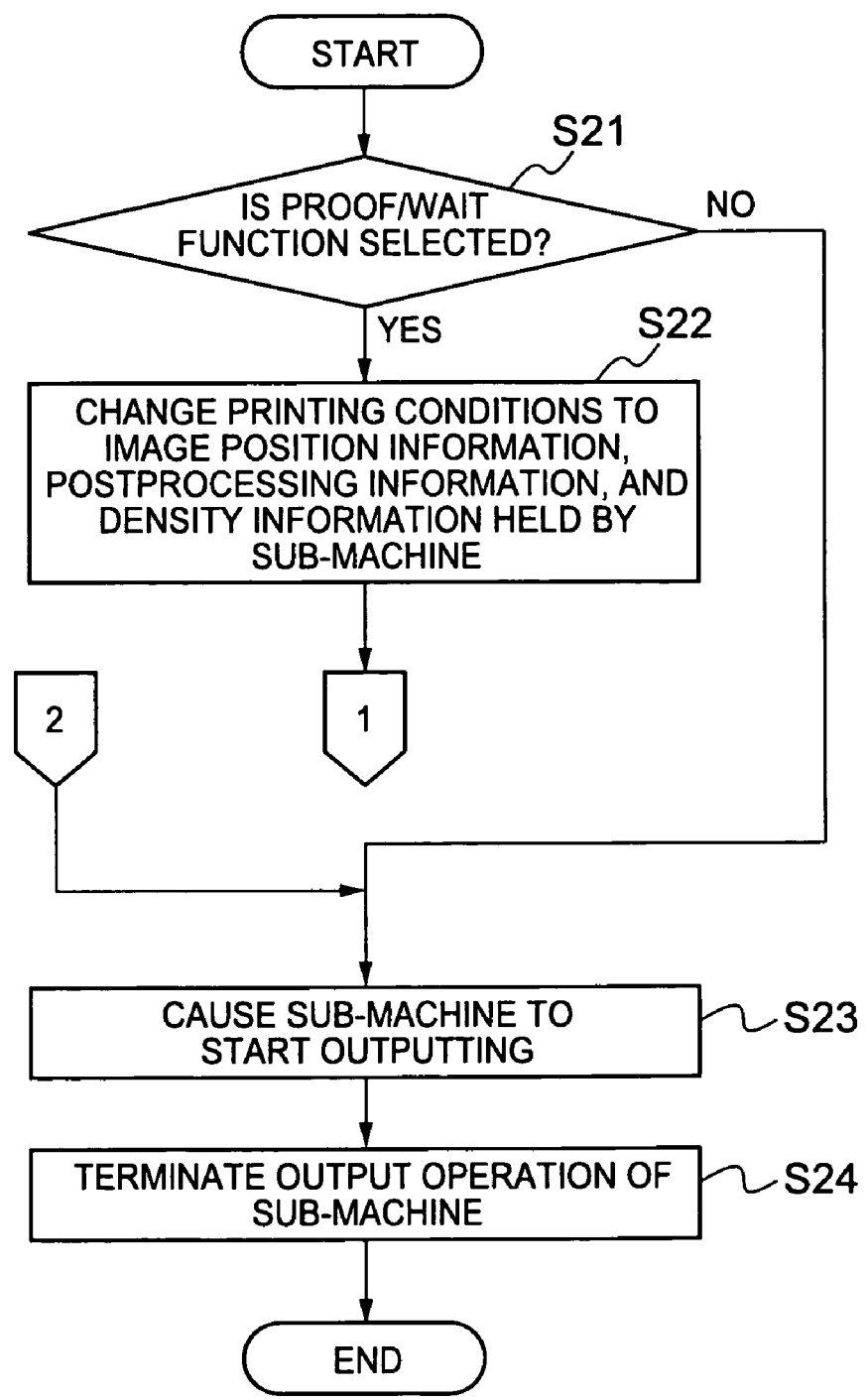

An example of the operation of each of the image printing system 100 and digital multifunction copying machines 110 and 120 described above will be described as an embodiment of the image printing method according to the present invention with reference to the flow charts of FIGS. 8 to 11. FIGS. 8 and 9 are flow charts showing an example of the printing (image forming) processing by the digital multifunction copying machine 110. FIGS. 10 and 11 are flow charts showing an example of the printing processing by the digital multifunction copying machine 120 serving as a sub-machine.

This embodiment is based on the premise that in the image printing system 100 described above, the digital multifunction copying machine 110 which has received printing conditions (image printing conditions) and image information from the information processing apparatus 130 and has become a master machine and the digital multifunction copying machine 120 which has received the printing conditions and image information transferred from the master machine 110 and has become a sub-machine share and concurrently process a printing job for outputting a plurality of prints.

Assume that in the master machine 110, the output condition information 80 including the printing conditions supplied from the information processing apparatus 130 is automatically created by adding the default output condition information 47b (see FIG. 8) stored in the nonvolatile memory 47 of the master machine 110 to the printing conditions as shown in FIG. 7.

[Example of Printing Processing by Master Machine 110]

Figure 1:
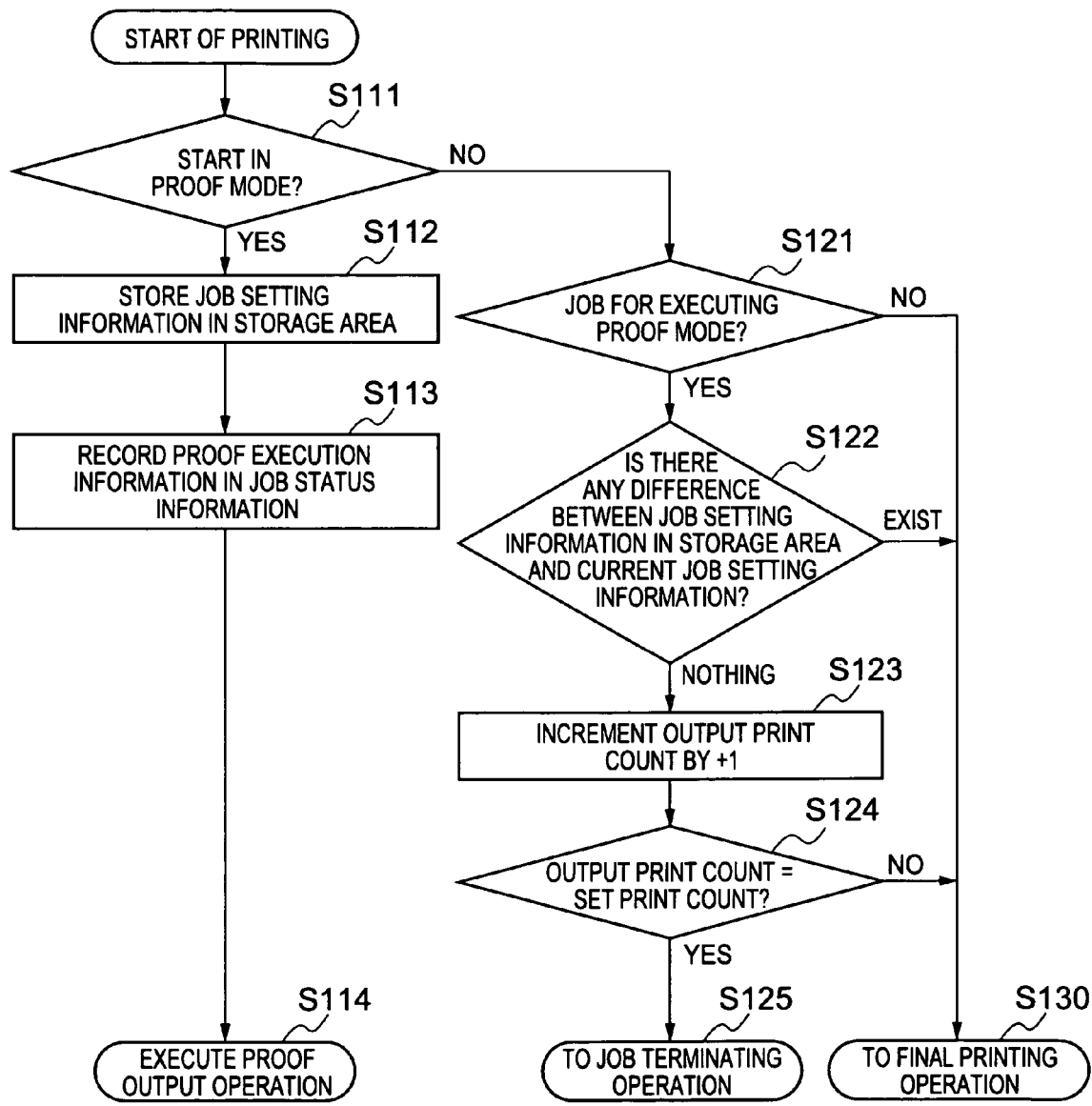
FIG. 1 is a flow chart showing an example of proof operation in a conventional image printing system.

Under the above premise, first of all, it is checked in step S1 in the flow chart shown in FIG. 9-1 whether or not selection is made to use the proof/wait selection function of the master machine 110 in the printing conditions supplied from the information processing apparatus 130. If flag "1" or "2" is set in the storage area 81a included in the job status information 81 of the output condition information 80 shown in FIG. 7 by the printing conditions supplied from the information processing apparatus 130, it is determined that the proof/wait selection function of the master machine 110 is used (YES). It is then checked in step S2 whether or not the switch 70 of the sub-machine 120 is set to allow the use of the proof/wait selection function of the sub-machine 120. If the sub-machine 120 can use the proof/wait selection function (YES), the flow advances to step S3 to send out the printing conditions and image information to the sub-machine 120.

In this case, as shown in FIG. 7, the printing conditions and image information transferred from the master machine 110 to the sub-machine 120 have an arrangement in which the output condition information 80 constituted by the default output condition information 47b stored in the nonvolatile memory 47 of the master machine 110 and printing information is automatically added as header information to the image information 90. This allows the sub-machine 120 to acquire printing conditions and image information without waiting for a check on printing conditions and an output state by the master machine 110. Therefore, the processing efficiency improves.

If flag "0" is set in the storage area 81a for the output condition information 80 to inhibit the master machine 110 from using the proof/wait selection function (NO in step S1), the flow advances to step S3 to start sending out printing conditions and image information to the sub-machine 120. In this case as well, the printing conditions and image information transferred from the master machine 110 to the sub-machine 120 have a structure in which the output condition information 80 is automatically attached as header information to the image information 90, as shown in FIG. 7.

It is then checked, from the flag set in the storage area 81a for the job status information 81, in step S4 whether or not the proof/wait selection function of the master machine 110 is effective. If the proof/wait selection function is ineffective (NO), the master machine 110 is made to start outputting prints in step S5, and the printing processing by the master machine 110 is terminated. With this operation, when there is no need for the master machine 110 to check the details of printing conditions and an output state, and priority is given to the processing efficiency for a printing job, the master machine 110 starts outputting prints together with the start of sending printing conditions and image information to the sub-machine 120. This makes it possible to efficiently execute parallel processing of prints by the master machine 110 and sub-machine 120.

If the switch 70 of the sub-machine 120 is set to inhibit the sub-machine 120 from using the proof/wait selection function (NO in step S2), the flow shifts to step S11 in the flow chart shown in FIG. 9-2 to check whether or not the proof mode is selected in the proof/wait selection function of the master machine 110. If flag "1" is set in the storage area 81a for the output condition information 80 shown in FIG. 7, it is determined that the proof mode is selected in the master machine 110 (YES), the proof output operation of outputting only one print is started in step S12.

When the proof output operation is complete in step S13, the master machine 110 automatically shifts to the wait mode. In step S14, the "setting check" window P1 based on the proof/wait selection function shown in FIG. 3A is displayed on the display unit 131 of the information processing apparatus 130 and on the LCD 11 of the master machine 110. This makes it possible to check the output state of a print based on the printing conditions and image information supplied from the information processing apparatus 130 and the default output condition information 47b in the master machine 110. Even if the output state is not good enough, the output condition information 80 can be easily set again by selecting the "image shift" key K1, "postprocessing position" key K2, or "output density value" key K3 in the "setting check" window P1. Therefore, printing condition scan be easily changed.

If it is confirmed by the proof output that the output state of the print by the master machine 110 is good, the flow advances to step S17 without changing the printing conditions (NO) in step S15. If there is no need to check an output state in the proof mode again (NO), the proof/wait selection function of the master machine 110 is nullified by selecting the "end" key K8 in the "setting check" window P1 shown in FIG. 3A.

If it is confirmed from the proof output that the output state of the print from the master machine 110 is not good, selection is made to change the printing conditions (YES) in step S15. In step S16, the "setting check" window P1 shown in FIG. 3A is switched to one of the detail setting windows P2 to P11 shown in FIGS. 3B to 6C to set output condition information for the master machine 110 again, thereby changing the printing conditions. If it is necessary to check the output state based on the printing conditions after the change, a shift is made to the proof mode by selecting the "check copy" key K6 in the "setting check" window P1 (YES) in step S17 to return to step S12. In this manner, the processing in steps S12 to S17 is repeated until the output state in the master machine 110 becomes good enough.

If flag "2" is set in the storage area 81a for the output condition information 80 shown in FIG. 7, the wait mode is selected in the master machine 110 (NO in step S11). In step S14, the "setting check" window P1 shown in FIG. 3A is displayed on the display unit 131 of the information processing apparatus 130 and on the LCD 11 of the master machine 110. If the details of the printing conditions are checked in the "setting check" window P1 and the printing conditions are to be changed (YES in step S15), the printing conditions are changed in step S16. The flow then advances to step S17. If the printing conditions are not to be changed (NO in step S15), the flow advances to step S17 without changing the printing conditions. In either case, if it is necessary to check the output state based on the printing conditions displayed in the "setting check" window P1, a shift to the proof mode is made by selecting the "check copy" key K6 in the "setting check" window P1 (YES). The flow then returns to step S12.

Regardless of whether the proof mode or wait mode is selected in the master machine 110, the printing conditions can be changed by repeating the processing in steps S12 to S17 while checking the details of the printing conditions in the master machine 110 or the output state. This makes it possible to easily set printing conditions which can provide a good output state.

If printing conditions which provide a good output state are confirmed through the loop of steps S12 to S17, and it is unnecessary to check the output state from a proof output (NO in step S17), the flow advances to step S18 to nullify the proof/wait selection function of the master machine 110 by selecting the "end" key K8 in the "setting check" window P1. The flow then returns to step S3 in FIG. 8.

The printing conditions for which an output state has been checked by the proof/wait selection function of the master machine 110 in this manner and image information are sent out to the sub-machine 120 in step S3. At this time, since the proof/wait selection function of the master machine 110 has already been nullified (NO in step S4), the master machine 110 is caused to start output operation in step S5. With this operation, even when the use of the proof/wait selection function of the sub-machine 120 is inhibited, since the printing conditions for which an output state has been checked by the master machine 110 are transferred, together with image information, to the sub-machine 120, the master machine 110 and sub-machine 120 can share and concurrently execute the operation of outputting a plurality of prints while maintaining an output state with necessary and sufficient high quality.

If both the master machine 110 and the sub-machine 120 are to check printing conditions and output states by using the proof/wait selection functions (YES in step S1 and YES in step S2), since it is determined in step S4 that the proof/wait selection function of the master machine 110 is effective (YES), the flow shifts to step S11 in FIG. 9-2 to check the printing conditions and output state in the master machine 110 through the loop of steps S12 to S17. After the proof/wait selection function is nullified in step S18, the flow returns to step S5 in FIG. 8 to cause the master machine 110 to start outputting prints.

In this manner, the printing processing by the master machine 110 is complete.

[Example of Printing Processing by Sub-Machine 120]

An example of printing processing by the sub-machine 120 to which printing conditions and image information are transferred from the master machine 110 described above will be described next.

After the sub-machine 120 acquires the printing conditions and image information sent out from the master machine 110, it is checked first in step S21 in the flow chart of FIG. 10-1 whether or not the use of the proof/wait selection function of the sub-machine 120 is selected. If the use of the proof/wait selection function of the sub-machine 120 is nullified by the switch 70 of the sub-machine 120 (NO), the flow advances to step S23 to cause the sub-machine 120 to start outputting prints on the basis of the printing conditions and image information transferred from the master machine 110.

In step S24, outputting of prints by the sub-machine 120 is finished, and the printing processing by the sub-machine is terminated. The printing conditions and image information used in this case are information obtained by attaching, to the image information 90, the output condition information 80 as header information obtained by adding the default output condition information 47b in the master machine 110 to the printing conditions supplied from the information processing apparatus 130. Assume that even when the sub-machine 120 is made to output a print by using the output condition information 80 created by the master machine 110, equivalent output states can be obtained from the both the master machine 110 and the sub-machine 120, for example, there are no significant differences in mechanical characteristic and maintenance between the master machine 110 and the sub-machine 120. In this case, by nullifying the proof/wait selection function using the switch 70 of the sub-machine 120, a decrease in throughput due to the proof/wait selection function of the sub-machine 120 can be avoided.

If the switch 70 is so set as to use the proof/wait selection function of the sub-machine 120 (YES in step S21), the printing conditions are changed by replacing the image position information, postprocessing information, and density information included in the printing conditions transferred from the master machine 110 with the default output condition information 47b stored in the nonvolatile memory 47 of the sub-machine 120 in step S22. The flow then shifts to step S31 in the flow chart of FIG. 10-2. The printing conditions and output state in the sub-machine 120 are then checked in steps S31 to S37 in the same manner as a check on the printing conditions and output state in the master machine 110 described above (see FIG. 9-2). If it is determined in step S37 that a check on the output state by a proof output in the sub-machine 120 is complete, the flow returns to step S23 in FIG. 10-1 to cause the sub-machine 120 to start outputting prints.

In step S24, outputting of prints from the sub-machine 120 is complete, and the printing processing by the sub-machine 120 is terminated. The printing conditions used in this case are the conditions obtained by re-setting the output condition information 80 automatically created from the default output condition information 47b unique to the master machine 110 by using the default output condition information 47b unique to the sub-machine 120.

Using the pieces of default output condition information 47b unique to the master machine 110 and sub-machine 120 makes it possible to easily eliminate the difference in output state due to the differences between the mechanical characteristics and maintenance states unique to the respective digital multifunction apparatuses. Therefore, the output state of prints output from the sub-machine 120 can be made equivalent to the good output state of the master machine 110.

Although whether or not to use the proof/wait selection in the sub-machine 120 may be selected by setting the switch 70 of the sub-machine 120 as in the above printing processing. However, this selection may be made by setting flag "0" in the storage area 81a of the sub-machine for the job status information 81 in accordance with the printing conditions supplied from the information processing apparatus 130.

As described above, in this embodiment, since the digital multifunction copying machine 120 which receives transferred printing conditions and image information and serves as a sub-machine can also execute printing processing based on the proof/wait selection function, the sub-machine 120 can also output a single print in the proof mode and check its output state, or change the details of printing conditions in the wait mode.

Even if, therefore, it is necessary for the master machine 110 and sub-machine 120 to have equally high-quality output states, since printing conditions can be set again while the output state in the sub-machine 120 is checked by the proof/wait selection function, a plurality of digital multifunction copying machines 110 and 120 can be made to share and concurrently output a plurality of prints in equally high-quality output states.

In addition, the output condition information 80 in the sub-machine 120 can be automatically adjusted by the default output condition information 47b stored in the nonvolatile memory 47 of the sub-machine 120 such that the output state of the sub-machine 120 becomes equivalent to that of the master machine 110. The processing efficiency for printing jobs can be improved. Switching the switch 70 provided on the sub-machine 120 can eliminate the stop time of the processing of a printing job by proof/wait operation. Therefore, the present invention can properly cope with a case wherein importance is placed on the processing efficiency of a printing job.

Only when an output state equal in quality to that of the master machine 110 is required, printing conditions can be adjusted and set again while the output state of the sub-machine 120 is checked by the proof/wait selection function in the sub-machine 120. This allows a plurality of digital multifunction copying machines 110 and 120 to share and concurrent execute the operation of outputting prints with necessary and sufficient quality without degrading the processing efficiency of the overall image printing system 100.

What is claimed is:

1. An image printing system comprising:
a main machine image printing apparatus;

a sub machine image printing apparatus; communication means for interactively connecting the main machine image printing apparatus and the sub machine image printing apparatus; and an information processing apparatus which is connected to the communication means and which supplies an image printing job to the main machine image printing apparatus;

wherein each of the main machine image printing apparatus and sub machine image printing apparatus further comprises:
  (i) an operating display unit which displays a setting screen for setting image printing conditions of the image printing job; and
  (ii) a nonvolatile memory which stores output condition information to be attached to the image printing job supplied from the information processing apparatus;

wherein each of the main machine image printing apparatus and the sub machine image printing apparatus has: (i) a proof mode in which after the image printing apparatus outputs a single image printing object as a confirmation print based on the image printing job, the image printing apparatus displays the setting screen on the operating display unit, to direct a change of the image printing conditions of the image printing job, a performance of the proof mode, or a performance of an image printing operation, and then the image printing apparatus waits, and (ii) a wait mode in which the image printing apparatus displays the setting screen on the operating display unit, to direct the change of the image printing conditions of the image printing job, the performance of the proof mode, or the performance of image printing operation, without outputting the confirmation print, and then the image printing apparatus waits;

wherein each of the main machine image printing apparatus and the sub machine image printing apparatus comprises a switch which is set to one of enable selection of the proof mode or wait mode and to prevent selection of the proof mode or wait mode;

wherein the image printing job supplied from the information processing apparatus comprises job status information, job setting information, and image information, and said job status information includes one of a proof selection flag to select the proof mode, a wait selection flag to select the wait mode, and no selection flag to select neither the proof mode nor the wait mode;

wherein when the job status information of the image printing job supplied to the main machine image printing apparatus includes the proof selection flag or wait selection flag, the main machine image printing apparatus determines whether or not the switch in the sub machine image printing apparatus has been set to enable selection of the proof mode or the wait mode;

wherein when the switch in the sub machine image printing apparatus has been set to enable selection of the proof mode or the wait mode, the main machine image printing apparatus changes the job setting information of the image printing job supplied from the information processing apparatus by adding the output condition information stored in the nonvolatile memory of the main machine image printing apparatus to the job setting information and separately transfers a part of the image printing job in which the job setting information has been changed to the sub machine image printing apparatus;

wherein when the job status information includes the proof selection flag, the main machine image printing apparatus outputs a single image printing object as a confirmation print based on the image printing job in which the job information has been changed, and then displays the setting screen and waits, wherein when the job status information includes the wait selection flag, the main machine image printing apparatus immediately displays the setting screen and waits, without outputting the confirmation print, and wherein the main machine image printing apparatus performs the image printing operation based on the image printing job in which the job setting information has been changed when performance of the image printing operation is directed on the setting screen;

wherein when the job status information of the image printing job supplied from the image processing apparatus to the main machine image printing apparatus includes no selection flag, or when the switch in the sub machine image printing apparatus has been set to prevent selection of the proof mode or the wait mode, the main machine image printing apparatus changes the job setting information of the image printing job supplied from the image processing apparatus by adding the output condition information stored in the nonvolatile memory of the main machine image printing apparatus to the job setting information, the main machine image printing apparatus separately transfers the part of the image printing job in which the job setting information has been changed to the sub machine image printing apparatus, and the main machine image printing apparatus performs the image printing operation based on the image printing job in which the job setting information has been changed;

wherein when the switch in the sub machine image printing apparatus has been set to enable selection of the proof mode or the wait mode, the sub machine image printing apparatus changes the job setting information of the image printing job separately transferred from the main machine image printing apparatus based on the output condition information stored in the nonvolatile memory of the sub machine image printing apparatus;

wherein when the job status information includes the proof selection flag, the sub machine image printing apparatus outputs a single image printing object as a confirmation print based on the image printing job in which the job information has been changed, and then displays the setting screen and waits, wherein when the job status information includes the wait selection flag, the sub machine image printing apparatus immediately displays the setting screen and waits, without outputting the confirmation print, and wherein the sub machine image printing apparatus performs the image printing operation based on the image printing job in which the job setting information has been changed when performance of the image printing operation is directed on the setting screen; and wherein when the switch in the sub machine image printing apparatus has been set to prevent selection of the proof mode or the wait mode, the sub machine image printing apparatus performs the image printing operation in parallel with the main machine image printing apparatus based on the job setting information of the image printing job separately transferred from the main machine image printing apparatus, without changing the job setting information at the sub machine image printing apparatus.

2. A system according to claim 1, wherein the output condition information comprises at least one of image position information, post-processing information, and density information.

3. A system according to claim 2, wherein the image position information comprises at least one of obverse surface main scanning information, obverse surface sub-scanning information, reverse surface main scanning information, reverse surface sub-scanning information, obverse surface page spacing amount information, and reverse surface page spacing amount information of an image printing position.

4. A system according to claim 2, wherein the post-processing information comprises at least one of punching position information, stapling position information, folding position information, and cutting position information.

5. A system according to claim 2, wherein the density information is density data of at least one color of fundamental colors comprising yellow (Y), magenta (M), cyan (C), and black (K)

6. An image printing apparatus which performs an image printing operation based on an image printing job supplied thereto, the image printing apparatus comprising:
an operating display unit which displays a setting screen for setting image printing conditions of the supplied image printing job; and
a nonvolatile memory which stores output condition information to be attached to the supplied image printing job;
wherein the image printing apparatus has: (i) a proof mode in which after the image printing apparatus outputs a single image printing object as a confirmation print based on the image printing job, the image printing apparatus displays the setting screen on the operating display unit, to direct a change of the image printing conditions of the image printing job, a performance of the proof mode, or a performance of the image printing operation, and then the image printing apparatus waits, and (ii) a wait mode in which the image printing apparatus displays the setting screen on the operating display unit, to direct the change of the image printing conditions of the image printing job, the performance of the proof mode, or the performance of the image printing operation, without outputting the confirmation print, and then the image printing apparatus waits;
wherein the image printing apparatus further comprises a switch which is set to one of enable selection of the proof mode or wait mode and to prevent selection of the proof mode or wait mode;
wherein the image printing apparatus is operable as either of a main image machine printing apparatus and a sub machine image printing apparatus in a system including the main machine image printing apparatus, the sub machine image printing apparatus, and an image processing apparatus, wherein when the image printing apparatus operates as the main machine image printing apparatus the image printing job supplied thereto is supplied from the image processing apparatus, and when the image printing apparatus operates as the sub machine image printing apparatus the image printing job supplied thereto is supplied from the main machine image printing apparatus and is a part of the job supplied to the main machine image printing apparatus;
wherein the image printing job comprises job status information, job setting information, and image information, and said job status information includes one of a proof selection flag to select the proof mode, a wait selection flag to select the wait mode, and no selection flag to select neither the proof mode nor the wait mode;
wherein when the image printing apparatus operates as the main machine image printing apparatus:
when the job status information of the image printing job supplied to the main machine image printing apparatus includes the proof selection flag or wait selection flag, the main machine image printing apparatus determines whether or not the switch in the sub machine image printing apparatus has been set to enable selection of the proof mode or the wait mode;
when the switch in the sub machine image printing apparatus has been set to enable selection of the proof mode or the wait mode, the main machine image printing apparatus changes the job setting information of the image printing job supplied from the information processing apparatus by adding the output condition information stored in the nonvolatile memory of the main machine image printing apparatus to the job setting information and separately transfers a part of the image printing job in which the job setting information has been changed to the sub machine image printing apparatus;
when the job status information includes the proof selection flag, the main machine image printing apparatus outputs a single image printing object as a confirmation print based on the image printing job in which the job information has been changed, and then displays the setting screen and waits, and when the job status information includes the wait selection flag, the main machine image printing apparatus immediately displays the setting screen and waits, without outputting the confirmation print, and the main machine image printing apparatus performs the image printing operation based on the image printing job in which the job setting information has been changed when performance of the image printing operation is directed on the setting screen; and
when the job status information of the image printing job supplied from the image processing apparatus to the main machine image printing apparatus includes no selection flag, or when the switch in the sub machine image printing apparatus has been set to prevent selection of the proof mode or the wait mode, the main machine image printing apparatus changes the job setting information of the image printing job supplied from the image processing apparatus by adding the output condition information stored in the nonvolatile memory of the main machine image printing apparatus to the job setting information, the main machine image printing apparatus separately transfers the part of the image printing job in which the job setting information has been changed to the sub machine image printing apparatus, and the main machine image printing apparatus performs the image printing operation based on the image printing job in which the job setting information has been changed; and
wherein when the image printing apparatus operates as the sub machine image printing apparatus:
when the switch in the sub machine image printing apparatus has been set to enable selection of the proof mode or the wait mode, the sub machine image printing apparatus changes the job setting information of the image printing job separately transferred from the main machine image printing apparatus based on the output condition information stored in the nonvolatile memory of the sub machine image printing apparatus;
when the job status information includes the proof selection flag, the sub machine image printing apparatus outputs a single image printing object as a confirmation print based on the image printing job in which the job information has been changed, and then displays the setting screen and waits, and when the job status information includes the wait selection flag, the sub machine image printing apparatus immediately displays the setting screen and waits, without outputting the confirmation print, and the sub machine image printing apparatus performs the image printing operation based on the image printing job in which the job setting information has been changed when performance of the image printing operation is directed on the setting screen; and when the switch in the sub machine image printing apparatus has been set to prevent selection of the proof mode or the wait mode, the sub machine image printing apparatus performs the image printing operation in parallel with the main machine image printing apparatus based on the job setting information of the image printing job separately transferred from the main machine image printing apparatus, without changing the job setting information at the sub machine image printing apparatus.

7. An apparatus according to claim 6, wherein the output condition information comprises at least one of image position information, post-processing information, and density information.

8. An apparatus according to claim 7, wherein the image position information comprises at least one of obverse surface main scanning information, obverse surface sub-scanning information, reverse surface main scanning information, reverse surface sub-scanning information, obverse surface page spacing amount information, and reverse surface page spacing amount information of an image printing position.

9. An apparatus according to claim 7, wherein the post-processing information comprises at least one of punching position information, stapling position information, folding position information, and cutting position information.

10. An apparatus according to claim 7, wherein the density information includes density data of at least one color of fundamental colors comprising yellow (Y), magenta (M), cyan (C), and black (K)

11. An image printing method, for a system that includes a main machine image printing apparatus, a sub machine image printing apparatus, communication means for interactively connecting the main machine image printing apparatus and the sub machine image printing apparatus, and an information processing apparatus which is connected to the communication means, wherein each of the main machine image printing apparatus and sub machine image printing apparatus further comprises:
(i) an operating display unit which displays a setting screen for setting image printing conditions of the image printing job; and
(ii) a nonvolatile memory which stores output condition information to be attached to the image printing job supplied from the information processing apparatus;

wherein each of the main machine image printing apparatus and the sub machine image printing apparatus has: (i) a proof mode in which after the image printing apparatus outputs a single image printing object as a confirmation print based on the image printing job, the image printing apparatus displays the setting screen on the operating display unit, to direct a change of the image printing conditions of the image printing job, a performance of the proof mode, or a performance of an image printing operation, and then the image printing apparatus waits, and (ii) a wait mode in which the image printing apparatus displays the setting screen on the operating display unit, to direct the change of the image printing conditions of the image printing job, the performance of the proof mode, or the performance of image printing operation, without outputting the confirmation print, and then the image printing apparatus waits;

wherein each of the main machine image printing apparatus and the sub machine image printing apparatus comprises a switch which is set to one of enable selection of the proof mode or wait mode and to prevent selection of the proof mode or wait mode; and wherein the method comprises:
supplying an image printing job from the information processing apparatus to the main machine image printing apparatus, wherein the image printing job comprises job status information, job setting information and image information, and said job status information includes one of a proof selection flag to select the proof mode, a wait selection flag to select the wait mode, and no selection flag to select neither the proof mode nor the wait mode;

determining, in the main machine image printing apparatus, whether the job status information of the image printing job includes the proof selection flag, the wait selection flag, or the no selection flag;

determining, in the main machine image printing apparatus, whether the or not the switch in the sub machine image printing apparatus has been set to enable selection of the proof mode or the wait mode, when it is determined that the job status information includes the proof selection flag or the wait selection flag;

in the main machine image printing apparatus, when it is determined that the switch in the sub machine image printing apparatus has been set to enable selection of the proof mode or the wait mode: changing the job setting information of the image printing job supplied from the information processing apparatus by adding the output condition information stored in the nonvolatile memory of the main machine image printing apparatus to the job setting information; and separately transferring a part of the image printing job in which the job setting information has been changed to the sub machine image printing apparatus from the main machine image printing apparatus;

in the main machine image printing apparatus: outputting a single image printing object as a confirmation print based on the image printing job in which the job information has been changed, and then displaying the setting screen and waiting, when the job status information includes the proof selection flag; immediately displaying the setting screen and waiting, without outputting the confirmation print, when the job status information includes the wait selection flag; and performing the image printing operation based on the image printing job in which the job setting information has been changed when performance of the image printing operation is directed on the setting screen;

in the main machine image printing apparatus, when the job status information of the image printing job supplied from the image processing apparatus to the main machine image printing apparatus includes no selection flag, or when the switch in the sub machine image printing apparatus has been set to prevent selection of the proof mode or the wait mode: changing the job setting information of the image printing job supplied from the image processing apparatus by adding the output condition information stored in the nonvolatile memory of the main machine image printing apparatus to the job setting information; separately transferring the part of the image printing job in which the job setting information has been changed to the sub machine image printing apparatus; and performing the image printing operation based on the image printing job in which the job setting information has been changed;

in the sub machine image printing apparatus, when the switch in the sub machine image printing apparatus has been set to enable selection of the proof mode or the wait mode, changing the job setting information of the image printing job separately transferred from the main machine image printing apparatus based on the output condition information stored in the nonvolatile memory of the sub machine image printing apparatus;

in the sub machine image printing apparatus: outputting a single image printing object as a confirmation print based on the image printing job in which the job information has been changed, and then displaying the setting screen and waiting, when the job status information includes the proof selection flag; immediately displaying the setting screen and waiting, without outputting the confirmation print, when the job status information includes the wait selection flag; and performing the image printing operation based on the image printing job in which the job setting information has been changed when performance of the image printing operation is directed on the setting screen; and in the sub machine image printing apparatus, when the switch in the sub machine image printing apparatus has been set to prevent selection of the proof mode or the wait mode, performing the image printing operation in parallel with the main machine image printing apparatus based on the job setting information of the image printing job separately transferred from the main machine image printing apparatus, without changing the job setting information at the sub machine image printing apparatus.

* * * * *